United States Patent [19]

Yoshida et al.

[11] Patent Number: 5,086,481
[45] Date of Patent: Feb. 4, 1992

[54] APPARATUS FOR CONVERTING OUTLINE DATA INTO DOT DATA, HAVING MEANS FOR ASSURING CONTINUITY OF VISIBLE REPRESENTATIONS REPRODUCED BY THE DOT DATA

[75] Inventors: Hitoshi Yoshida, Kohnan; Takahiro Kanegae, Nagoya; Naoyuki Kawamoto, Toki, all of Japan

[73] Assignee: Brother Kogyo Kabushiki Kaisha, Aichi, Japan

[21] Appl. No.: 486,605

[22] Filed: Feb. 28, 1990

[30] Foreign Application Priority Data

Mar. 4, 1989 [JP] Japan .................................. 1-52523

[51] Int. Cl.⁵ .................................................. G06K 9/48
[52] U.S. Cl. .................................. 382/22; 340/728; 340/747
[58] Field of Search ............... 340/728, 747, 736, 739; 382/22

[56] References Cited

U.S. PATENT DOCUMENTS

| | | | |
|---|---|---|---|
| 4,212,009 | 7/1980 | Adelman et al. | 340/747 |
| 4,586,835 | 5/1986 | Alexander et al. | 340/728 |
| 4,632,579 | 12/1986 | Takano et al. | 340/728 |
| 4,679,039 | 7/1987 | Neil et al. | 340/728 |
| 4,712,102 | 12/1987 | Troupes et al. | 340/728 |
| 4,829,295 | 3/1987 | Hiroyuki | 340/728 |
| 4,837,847 | 1/1988 | Shirasaka et al. | 382/22 |

*Primary Examiner*—Michael Razavi
*Attorney, Agent, or Firm*—Oliff & Berridge

[57] ABSTRACT

A data converting apparatus having a dot data preparing device for converting outline data representative of an outline of a visible representation such as characters, into dot data comprising dot-forming bits indicative of image dots to be formed at positions of respective picture elements which correspond to each stroke of the visible representation. The apparatus includes a discontinuity detector for detecting a discontinuous portion of each stroke as defined by the image dots to be formed according to the dot-forming bits, by checking the dot-forming bits to determine whether the image dots represented by the dot-forming bits are discontinuous along the outline of the stroke. The apparatus further includes a discontinuity eliminator for processing the outline data prior to the conversion of the outline data into the dot data, such that the dot data prepared by the dot data preparing means include dot-forming bits indicative of image dots to be formed at positions of respective picture elements which correspond to the discontinuous portion.

22 Claims, 15 Drawing Sheets

FIG. 6
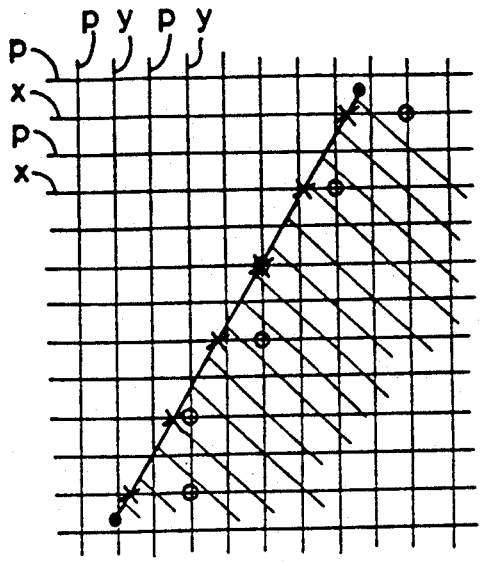
FIG. 9
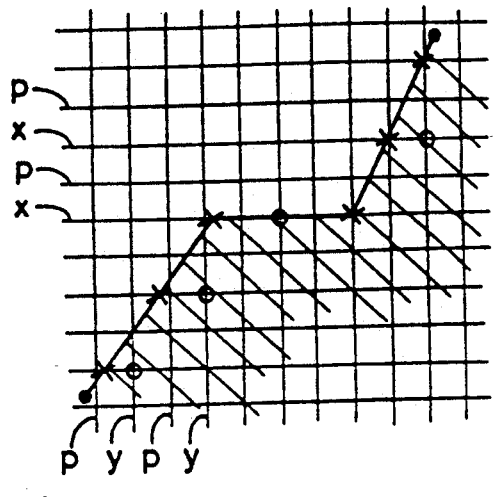
FIG. 7
FIG. 10
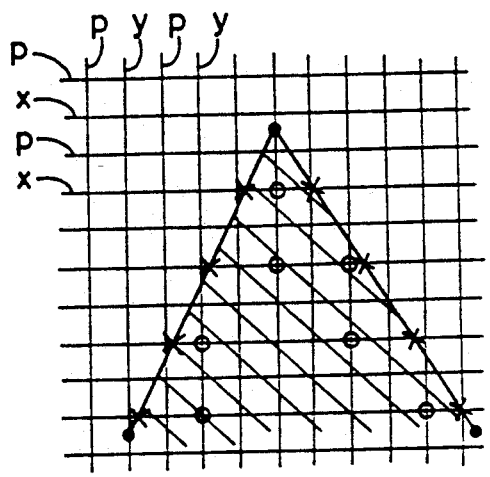
FIG. 8
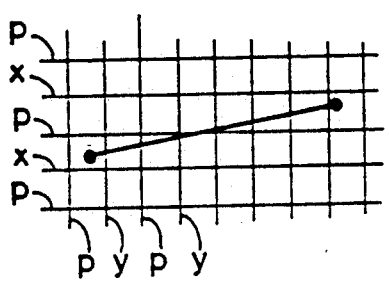
FIG. 11
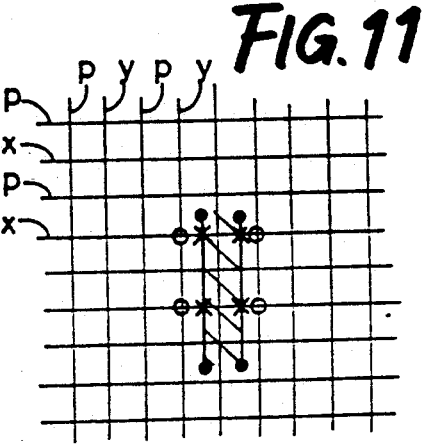

FIG. 14

| Y-AXIS COORDINATE VALUES OF PIXEL LINES x | NUMBER OF INTERSECTIONS | X-AXIS COORDINATE VALUES |
|---|---|---|
| 20 | 0 | |
| 19 | 0 | |
| 18 | 0 | |
| 17 | 0 | |
| 16 | 0 | |
| 15 | 4 | 9, 10, (8,+1), (11,-1) |
| 14 | 4 | (5,+4), (14,-5), (15,-6), (4,+4) |
| 13 | 4 | (2,+3), (17,-3), (18,-3), (1,+3) |
| 12 | 0 | |
| 11 | 0 | |

FIG. 15

| Y-AXIS COORDINATE VALUES OF PIXEL LINES x | NUMBER OF INTERSECTIONS | X-AXIS COORDINATE VALUES |
|---|---|---|
| 20 | 0 | |
| 19 | 0 | |
| 18 | 0 | |
| 17 | 0 | |
| 16 | 0 | |
| 15 | 4 | (8,+1),(11,-1),9,10 |
| 14 | 4 | (4,+4),(5,+4),(14,-5),(15,-6) |
| 13 | 4 | (1,+3),(2,+3),(17,-3),(18,-3) |
| 12 | 0 | |
| 11 | 0 | |

FIG. 16

| Y-AXIS COORDINATE VALUES OF PIXEL LINES x | NUMBER OF INTERSECTIONS | X-AXIS COORDINATE VALUES |
|---|---|---|
| 20 | 0 | |
| 19 | 0 | |
| 18 | 0 | |
| 17 | 0 | |
| 16 | 0 | |
| 15 | 4 | (7,+1), (11,-1), 9, 12 |
| 14 | 4 | (3,+4), (6,+4), (13,-5), (16,-4) |
| 13 | 4 | (1,+3), (2,+3), (17,-3), (18,-3) |
| 12 | 0 | |
| 11 | 0 | |

APPARATUS FOR CONVERTING OUTLINE DATA INTO DOT DATA, HAVING MEANS FOR ASSURING CONTINUITY OF VISIBLE REPRESENTATIONS REPRODUCED BY THE DOT DATA

BACKGROUND OF THE INVENTION

1. Field of the Invention

The present invention relates in general to an apparatus for converting outline data representative of the outline of a visible representation such as letters, symbols and other characters or graphical representations, into dot data representative of image dots to be formed to reproduce the visible representation. More particularly, the present invention is concerned with improvements in the continuity of each stroke of the character or other visible representation.

2. Discussion of the Prior Art

Visible representations or characters such as letters, numerals and symbols represented by character data are printed, displayed or otherwise reproduced according to the character data suitably processed by a computer. Commonly, the character data takes the form of dot data indicating whether a dot should be formed in each of picture elements which are the smallest part of picture image and which determine the resolution of the reproduced image. If a batch of dot data representative of all the characters available for reproduction is prepared and stored in a character data memory, the memory should have an extremely large storage capacity. It is therefore desirable to store a batch of outline data representative of the outlines of the characters, and convert the outline data into the corresponding dot data by suitable data converting means, when the visible representations are printed, displayed or otherwise reproduced, as disclosed in Japanese Patent Publication No. 53-41017.

An example of a data converting apparatus as described above is disclosed in co-pending U.S. patent application Ser. No. 07/425,604 filed Oct. 23, 1989. In the data converting device disclosed therein, the outline of each character represented by outline data is superimposed on a coordinated pixel screen in which picture elements are defined along a plurality of parallel scanning or pixel lines parallel to the X axis of the screen. Each pixel line passes the centers of an array of the picture elements. In converting the outline data into dot data, X-axis coordinate values of intersections between the character outline and each pixel line are calculated. More precisely, the coordinate values of the picture elements which are nearest to the intersections and inside the character outline are calculated. Based on the calculated coordinate values, bits of the dot data are set to indicate the presence of image dots at the positions of the picture elements corresponding to the width of a stroke of the character. These dot data bits are referred to as "dot-forming bits". In this data converting apparatus, each of the pixel lines intersecting one or more strokes of the character has two X-axis coordinate values for each stroke of the character. These two coordinate values define the width of the stroke as measured along the relevant pixel line. Since image dots are formed at and between the two coordinate values, bits of the dot data which correspond to the picture elements at and between the two coordinate values are set to indicate the presence of the image dots. This apparatus is therefore capable of setting at one time the bits of the dot data between the calculated two X-axis coordinates for each stroke, with respect to one pixel line, without determining whether an image dot should be formed at each picture element position within the width of the stroke. Thus, the character outline data may be efficiently and easily converted into the corresponding batch of dot data.

However, there is a possibility that the character outline does not intersect any one of the pixel lines. For example, if a stroke of a character is relatively narrow, a certain portion of the outline of that narrow stroke does not intersect any pixel lines. In this case, no X-axis coordinate values are obtained for that given portion of the stroke, and as a result, the prepared dot data for the stroke do not include dot-forming bits for the given portion of the stroke. Accordingly, the stroke reproduced according to the dot data is discontinuous and has a poor appearance.

The problem of the discontinuity of the stroke indicated above may be eliminated by using a sufficiently large number of scanning lines parallel to the above-indicated pixel lines which pass the centers of the picture elements. For example, the scanning lines are provided at a pitch which is a half of the pitch of the pixel lines. In this case, there is a reduced or no possibility that a stroke of a character does not intersect any one of the scanning lines, whereby each of almost all portions of the stroke has two intersections with the relevant scanning lines. Accordingly, the discontinuity of the stroke reproduced according to the prepared dot data may be reduced or eliminated. However, this arrangement requires an increased time for calculating the coordinates of the intersections between the character outline and the scanning lines, and consequently reduces the above-indicated advantage of efficient conversion of the outline data into the dot data.

SUMMARY OF THE INVENTION

It is therefore an object of the present invention to provide a data converting apparatus capable of efficiently converting outline data of a visible representation such as a character into dot data, so that each stroke of the visible representation reproduced according to the dot data does not suffer from conventionally experienced discontinuity.

The above object may be accomplished according to this invention by providing in a data converting apparatus having dot data preparing means for converting, according to a predetermined rule, a batch of outline data stored in a memory and representative of an outline of a visible representation such as a letter, a symbol and a graphical representation, into a batch of dot data comprising dot-forming bits indicative of image dots to be formed at positions of respective picture elements which correspond to each sroke of the visible representation: (a) discontinuity detecting means for detecting a discontinuous portion of each stroke as defined by the image dots to be formed according to the dot-forming bits by checking the dot-forming bits to determine whether the image dots represented by the dot-forming bits are discontinuous along the outline of the stroke; and (b) discontinuity eliminating means responsive to the discontinuity detecting means, for processing the outline data before the outline data are converted into the dot data, such that the dot data prepared by the dot data preparing means include dot-forming bits indicative of image dots to be formed at positions of respective picture elements which correspond to the discontinuous portion.

In the data converting apparatus of the present invention constructed as described above, the dot data preparing means prepares the dot data from the outline data, such that the dot-forming bits of the dot data represent image dots which collectively form each stroke of the visible representation. A discontinuous portion of the stroke as defined by the image dots to be formed according to the dot-forming bits is detected by the discontinuity detecting means. If the discontinuous portion is detected, the outline data is processed before the conversion of the outline data into the dot data, such that the dot data prepared by the dot data preparing means include dot-forming bits indicative of image dots which are to be formed at positions of respective picture elements corresponding to the detected discontinuous portion. Accordingly, the stroke is formed by the image dots which are continuously arranged along the outline of the stroke. Thus, the present data converting apparatus assures continuity of each stroke of the visible representation defined by the outline data, without a discontinuous portion or complete absence of image dots over a relatively wide area, thereby assuring a good appearance of the visible representation reproduced according to the dot data.

BRIEF DESCRIPTION OF THE DRAWINGS

The above ad optional objects, features and advantages of the present invention will become more apparent by reading the following detailed description of presently preferred embodiments of the invention, when considered in connection with the accompanying drawings in which:

FIGS. 6, 7, 8, 9, 10 and 11 are illustrations explaining different methods of determining intersections between x-axis pixel lines, and segments of a character outline which is converted into dot data by the data converting apparatus;

FIG. 14 is a view indicating the x-axis coordinate values of the intersections between the stroke of FIG. 12 and the x-axis pixel lines;

FIG. 15 is a view indicating the pairs of the x-axis coordinate values of FIG. 14 in the order of the magnitude of the values;

FIG. 16 is a view indicating values obtained by modifying the x-axis coordinate values of FIG. 15, for eliminating a discontinuous portion of the stroke reproduced according to the coordinate values of FIG. 15;

DETAILED DESCRIPTION OF THE PREFERRED EMBODIMENTS

Figure 1:
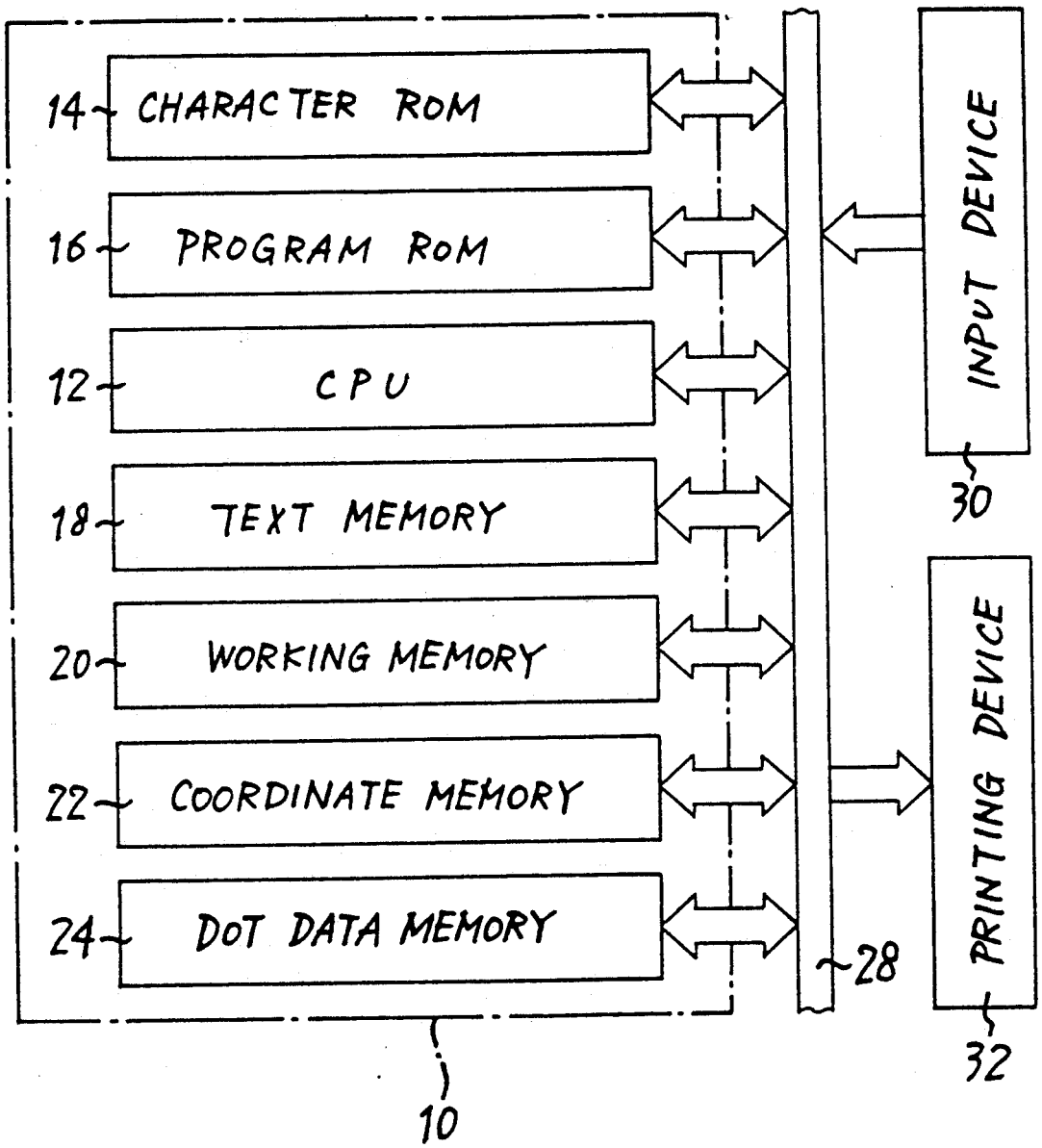
FIG. 1 is a schematic block diagram showing a control circuit of a laser printer which incorporates one embodiment of a data converting apparatus of the present invention.
Figure 2:
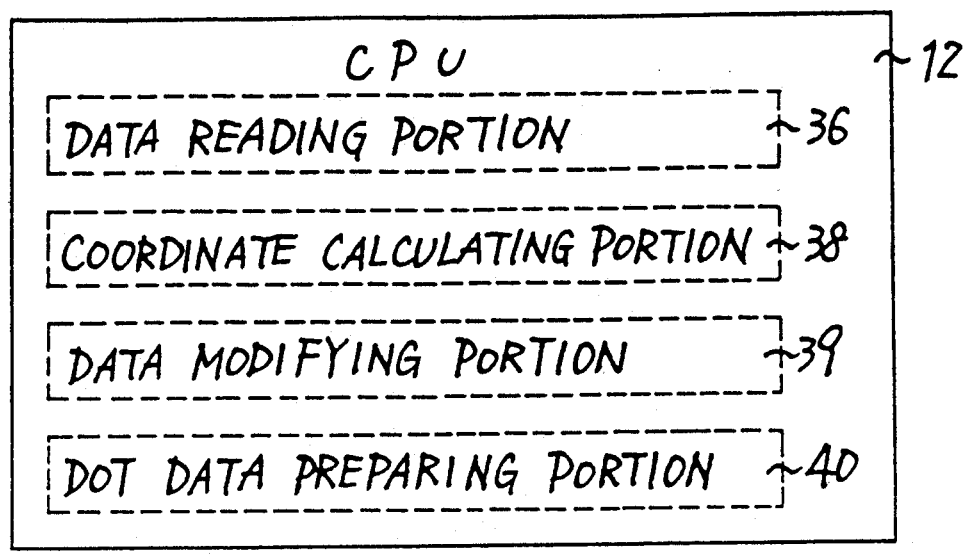
FIG. 2 is a schematic view of a central processing unit of the control circuit of FIG. 1.

Referring to FIGS. 1 and 2, there is illustrated a data converting apparatus constructed according to one embodiment of the present invention for converting outline data into dot data for printing in a laser printer, in which printing on a recording medium is effected by exposing the medium surface to a laser beam controlled according to the dot data.

The schematic block diagram of FIG. 1 shows a portion of a control circuit of the laser printer, which relates to data conversion according to the principle of the invention. The control circuit is principally constituted by a microcomputer 10, which includes a CPU (central processing unit) 12, a CHARACTER ROM (read-only memory) 14, a PROGRAM ROM (read-only memory) 16, a TEXT memory 18, a WORKING memory 20, a COORDINATE memory 22 and a DOT DATA memory 24. These elements of the microcomputer 10 such as the CPU 12 are interconnected to each other through a bus 28. To the bus 28, there are connected a data input device 30 and a printing device 32. The input device 30 is provided to load the microcomputer 10 with necessary data for printing, while the printing device 32 is constructed to effect laser printing according to commands and signals supplied from the microcomputer 10. The present laser printer has image resolution power of 300 dots per inch.

As schematically indicated in FIG. 2, the CPU 12 has a data reading portion 36, a coordinate calculating portion 38, a data modifying portion 39, and a dot data preparing portion 40. The coordinate calculating portion 38 operates to calculate coordinate of intersections between an outline of a character, and x-axis pixel lines x of a coordinated pixel screen (which will be described). The dot data preparing portion 40 operates to prepare dot data representative of the character, which dot data corresponds to the outline of the character. The TEXT memory 18 stores a batch of character data in the form of code data indicative of a text entered through the input device 30, and the WORKING memory 20 stores data necessary for the microcomputer 10 to execute various control programs stored in the PROGRAM memory 16. The COORDINATE memory 22 stores the coordinate data calculated by the coordinate calculating portion 38, and the DOT DATA memory 24 stores the dot data prepared by the dot data preparing portion 40.

Figure 4:
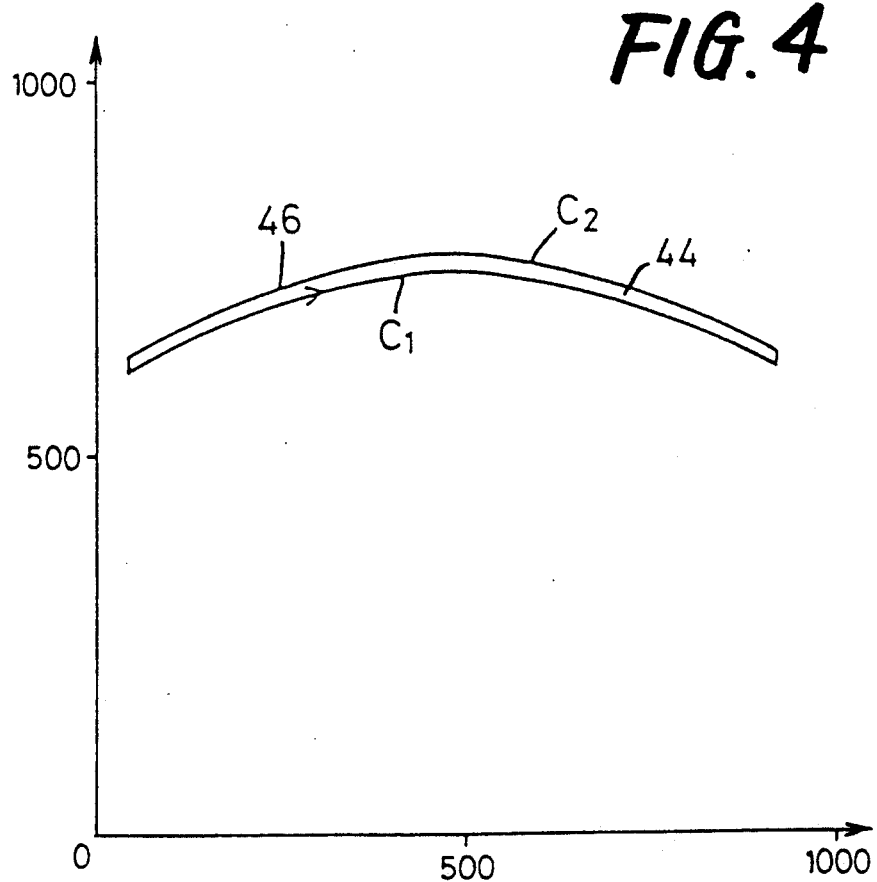
FIG. 4 is a view showing an outline of an arcuate stroke of a character, whose outline data is converted into dot data by the data converting apparatus of FIG. 1.

The CHARACTER ROM 14 stores multiple batches of outline data representative of the outlines of multiple characters such as alphabetic and other letters and symbols. The outline of each character is defined in an X-Y coordinate system having 1000 Y-axis positions taken along the Y axis, and 1000 X-axis positions taken along the X axis perpendicular to the Y axis, as indicated in FIG. 4. For example, the uppercases of all alphabetic letters are placed between the 200th and 1000th Y-axis positions, while the entire range of the Y-axis are used for the lowercases (namely, the 0th to 200th Y-axis positions are also used for the lowercases). When the configuration of each character is designed in the X-Y coordinate system indicated above, the profile of each stroke 44 of the character having a predetermined width is defined by a surrounding outline 46. The outline data of each character consists of a plurality of sets of segment data which represent respective segments of the outline 46. Each set of segment data includes segment-designating data indicative of a kind of the relevant segment, and coordinate data representative of coordinates of the start and end points of the segment. The coordinate data of the points defining the segments of the outline 46 are stored in the CHARACTER ROM 14, in the predetermined order, in the predetermined direction along the outline 46, as indicated by an arrow in FIG. 4. One of the two points defining each segment of the outline 46, whose coordinate data is stored preceding that of the other, is defined as the beginning or start point of the relevant segment, while the other point is defined as the end point of the segment. The segment data for a straight segment includes segment-designating data indicative of the straight segment, and coordinate data representative of the coordinates of the beginning and end points of the segment. The segment data for a curved segment includes segment-designating data indicative of the curved segment, function data indicative of a curvature of the segment, and coordinate data representative of the coordinates of the beginning and end points and an auxiliary point. The segment data for a circular arc segment includes segment-designating data indicative of the arc segment, and coordinate data representative of the coordinates of the beginning and end points and an arc center of the segment. The CHARACTER ROM 14 also stores data indicative of the number "N" of the segments of each character.

Figure 5:
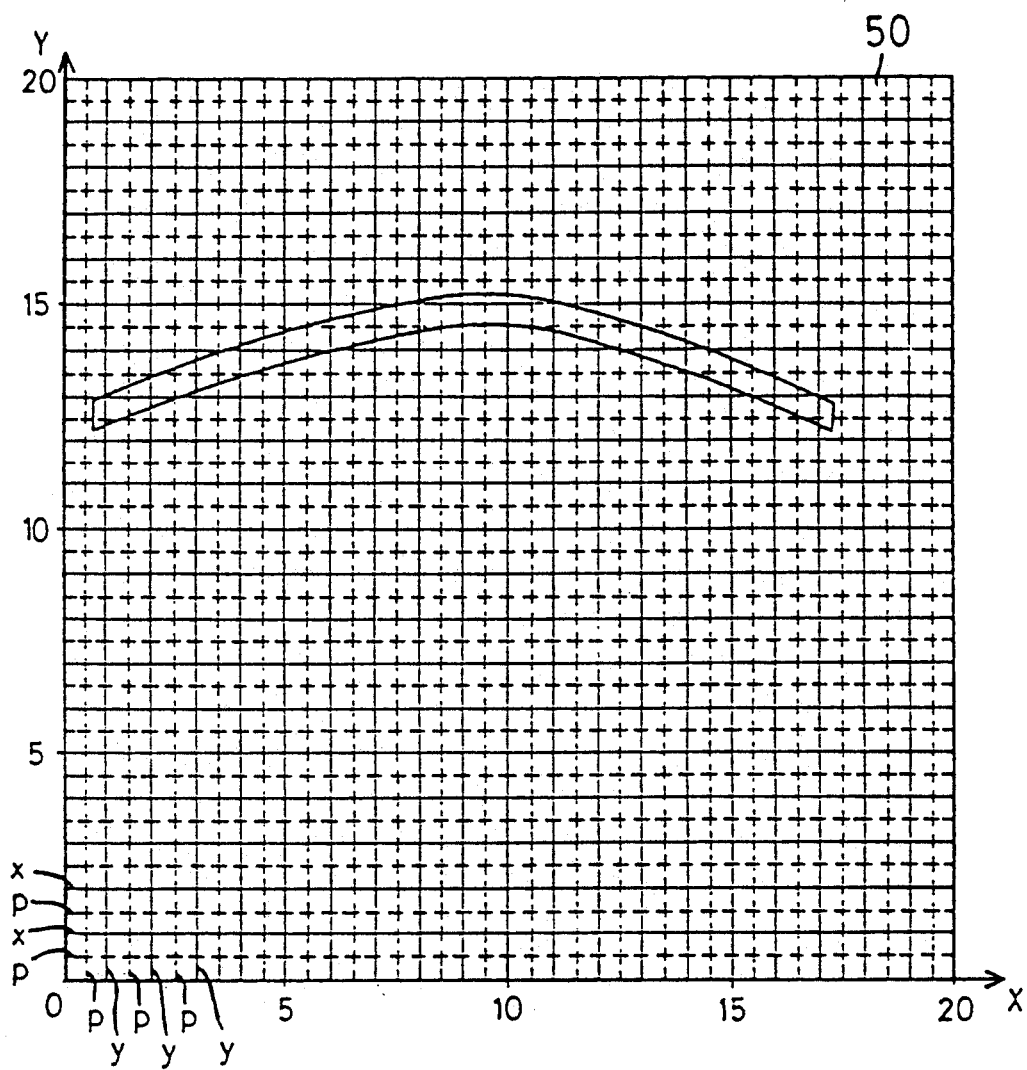
FIG. 5 is a view showing a part of a coordinated pixel screen on which the outline of the arcuate stroke of FIG. 4 is superimposed.

In the present laser printer constructed as described above, the conversion of the outline data of each character into a corresponding batch of dot data is effected by use of a two-dimensional coordinated pixel screen 50 as shown in FIG. 5, on which the outline 46 of the image is superimposed for preparing the dot data by conversion from the outline data. The pixel screen 50 consists of a multiplicity of picture elements, which are the smallest parts of a printed picture image available on the laser printer. The picture elements are defined by equally spaced-apart x-axis partition lines p parallel to the X-axis of the screen 50, and equally spaced-part y-axis partition lines p which are parallel to the Y-axis of the screen and perpendicular to the x-axis partition lines p. Thus, the picture elements used in the present embodiment are square in shape. Dot data corresponding to each picture element indicates whether a dot is printed at the corresponding picture element or not. As also shown in FIG. 5, there are provided multiple x-axis pixel lines x which extend parallel to the X-axis and are positioned intermediate between the adjacent x-axis partition lines p, and multiple y-axis pixel lines y which extend parallel to the Y-axis and are positioned intermediate between the adjacent y-axis partition lines p. Each x-axis pixel line x passes the centers of the picture elements in a corresponding row parallel to the X-axis, whiple each y-axis pixel line y passes the centers of the picture elements in a corresponding column parallel to the Y-axis. The position of each picture element is indicated by the coordinates of its center (pixel center), i.e., one of the x-axis pixel lines x and one of the y-axis pixel lines y. The picture elements may have rectangular or other shapes.

The coordinated pixel screen 50 corresponds to a printing area of a recording medium within which laser printing is effected according to appropriate batches of dot data. In the interest of brvity and simplification, FIG. 5 shows a portion of the coordinated pixel screen 50, which corresponds to one character of a multiplicity of characters to be printed in the printing area of the medium. The x-axis and y-axis pixel lines x and y are numbered over the entire area of the screen 52. It will be understood that the picture elements of the other characters not shown in FIG. 5 are represented by the x-axis and y-axis pixel lines x, y which are appropriately numbered, the numbers identifying these pixel lines x, y being larger than those for the character indicated in FIG. 5.

The conversion of the outline data into the corresponding dot data is effected with the outline of the character superimposed on the coordinated pixel screen 50, so that a dot is formed at each picture element of the screen 50 which lies within the area defined by the outline of the character (this area being hereinafter simply called "outline of the character"). In this embodiment, the logical value of the dot data bit corresponding to the picture element in which a dot is to be formed is "1". It will be understood that dots corresponding to some picture elements lie entirely within the outline of the character, while dots corresponding to some picture elements lie partially within the outline. The specific manner of converting the outline data into the dot data will be described in greater detail.

The present laser printer is capable of printing characters in a selected one of different sizes, namely, 4.8 point, 10 point, 12 point, 20 point, 24 point and 30 point, by way of example. According to the selected character size, the coordinates of the points defining the outline of the character in the 1000×1000 coordinate system of FIG. 4 are converted into the corresponding coordinate values on the coordinated pixel screen 50 of FIG. 5 in which each square picture element is dimensioned as 1×1. If a character of a selected point size is formed by a C×C matrix of picture element (dots), the coordinate values of a point on the pixel screen 50 are obtained by multiplying the coordinate values of the corresponding point on the character outline in the 1000×1000 coordinate system, by C/1000. In this example, the character size is 4.8 point, and each character is formed by a 20×20 matrix of picture elements or dots. The numbers 0 through 20 given on the pixel screen 50 in FIG. 5 to identify the x-axis and y-axis pixel lines x, y represent the coordinate values on the screen 50 in the present example. To superimpose the outline of each character on the pixel screen 50, the coordinate values of the reference point of the character on the screen 50 are determined, based on the printing position data. According to the determined coordinates of the reference point as well as the calculated coordinates of the character outline, the character outline is positioned on the pixel screen 50 of FIG. 5.

In the present embodiment, the conversion of the outline data for a character into the corresponding dot data is effected by first calculating coordinates of two intersections between each stroke of the character and the x-axis pixel lines x. Then, the dot data bits corresponding to the picture elements at and between the two intersections are set at one time to "1". Namely, the image-forming bits are set for those picture elements, so as to define the width of the character stroke as measured along each relevant x-axis pixel line x. The position of the x-axis pixel lines x which intersect the character outline is represented by the y-axis coordinate values of the pixel screen 50.

By reference to FIGS. 6 through 11, there will be described a rule according to which the x-axis coordinate values of the intersections between the character outline and the x-axis pixel lines x are determined.

FIG. 6 shows a straight segment of a character which intersects both of the x-axis pixel lines x and the y-axis pixel lines y. This straight segment intersects a plurality of x-axis pixel lines x, at respective positions indicated by "x" marks between the beginning and the end of the relevant segment. The x-axis coordinates to be stored in the COORDINATE memory 22 are not those of the intersections between the x-axis pixel lines x and the relevant segment, but are the x-axis coordinates of the centers (indicated by "o" marks in FIG. 6) of the picture elements which lie inside the area (indicated by hatched lines in the figure) defined by the segment and which are nearest to the segment along the X-axis (i.e., nearest to the intersections between the x-axis pixel lines x and the relevant segment). If an intersection between an x-axis pixel line x and the segment lies right on the center of a picture element, the x-axis coordinate of that pixel center is stored as the x-axis coordinate value.

A straight segment parallel to the x-axis pixel lines x is shown in FIG. 7. A straight segment shown in FIG. 8 is located between the adjacent two x-axis pixel lines x, and the length of the segment and the angle of inclination with respect to the x-axis pixel lines x are small enough to prevent the segment from intersecting any x-axis pixel lines x. In these cases of FIGS. 7 and 8, the COORDINATE memory 22 stores data which indicate that the relevant segment has no intersections with the x-axis pixel lines x. FIG. 9 shows a combination of three connected straight segments, the intermediate segment lying on one of the x-axis pixel lines x, while the other two segments being inclined with respect to the pixel lines x and connected to the opposite ends of the intermediate segment. In this case, the intermediate segment has no intersections. Further, the coordinates for one of the two outermost intersections of each of the two inclined segments are not stored in the COORDINATE memory 22. That is, the coordinate values are obtained for only one of the two outermost intersections whose x-axis coordinate value is smaller than that of the other (which is located to the left of the other in the x-axis direction in FIG. 9). Referring to FIG. 10, there is shown a relatively narrow end portion of a stroke of a character, which is defined by two intersecting inclined straight segments. These two segments intersect each other such that there exists only one picture element whose center is located inside the area defined by the two segments, with the center lying on the x-axis pixel line x adjacent to the point of intersection. In this case, the x-axis coordinate value of the center of the picture element indicated above is stored as the x-axis coordinate value of the intersection of each of the two inclined straight lines. In other words, the same intersection on the same x-axis pixel line x is obtained for each of the two intersecting inclined segments, at the same terminal portions on the side of the point of intersection of these two segments. In this case, therefore, the same x-axis coordinate value is stored as the x-axis coordinate values of the points at which the two segments intersect the x-axis pixel line x adjacent to the intersection of the two segments.

In the case of FIG. 11, a spacing between two straight segments parallel to the y-axis pixel lines y is small, and there exist no picture elements whose centers are located between the two segments. In this case, too, the same x-axis coordinate values are used for the two segments. Described specifically, the COORDINATE memory 22 stores, as the x-axis coordinate values of the intersections for the two segments, the x-axis coordinate values of the centers of the picture elements which are adjacent in the x-axis direction to the area defined by the two segments and which are positioned on one of opposite sides of that area on which the x-axis coordinate values are larger. If the centers of any picture elements lie within the area defined by the two segments, the x-axis coordinate values of those centers are stored as the x-axis coordinate values of the intersections between the x-axis pixel lines x and the two segments.

Figure 12:
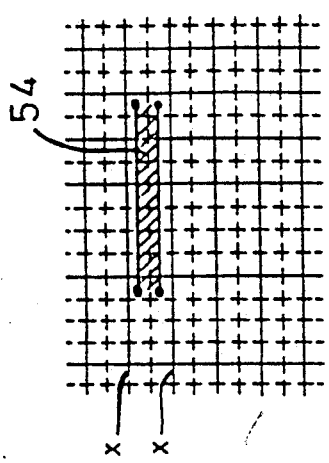
FIG. 12 is a view showing a stroke of a character which is interposed between two adjacent x-axis pixel lines.

According to the above rule for determining the coordinates of the intersections between the x-axis pixel lines x and the stroke segments, two sets of x-axis coordinate data are stored in the COORDINATE memory 22, for each of the relevant x-axis pixel lines x intersecting the character stroke, even where the stroke has a narrow width, namely, even where only one intersection or no intersection exists between the two adjacent x-axis pixel lines x. The two sets of x-axis coordinate data define the width of the stroke as measured along each relevant x-axis pixel line x, and the dot data bits corresponding to the width of the stroke are set to "1" (as dot-forming bits) at one time. However, there arises a problem in the case of a character stroke or a segment of a stroke, which is entirely interposed between the adjacent two x-axis pixel lines x as indicated at 54 in FIG. 12. In this case, no intersections are obtained for the interposed stroke or segment 54, and no dot-forming bits "1" are set for the picture elements corresponding to the stroke or segment 54. Accordingly, the character which has the interposed stroke or segment 54 and whose outline as defined by the character data is continuous is made discontinuous when reproduced according to the prepared dot data which does not include the dot-forming bits for the segment 54. Thus, the reproduced character has a discontinuous portion.

In the present printer having the data converting apparatus arranged according to the present embodiment of the invention, the dot data prepared by conversion from the outline data are modified to correct or eliminate the above-indicated discontinuous portion of the reproduced character. This aspect will be described. The PROGRAM ROM 16 stores various control programs necessary for printing, which includes a data conversion routine as illustrated in the flow chart of FIG. 3. This routine includes steps for eliminating the discontinuous portion. There will be described an operation to convert the outline data for the arcuate stroke 44 of FIG. 4 into the corresponding dot data, by way of example, referring to FIG. 3. In this respect, no detailed description on the manner of printing according to the dot data will be provided, since it is not essential to the understanding of the principle of the present invention.

Briefly, a text stored in the TEXT memory 18 is printed one page after another. Each time a page is printed, character data corresponding to that page of the text is retrieved from the TEXT memory 18, and a batch of outline data (stored in the CHARACTER ROM 14) corresponding to that page is converted into a corresponding batch of dot data.

Initially, step S1 is executed to read out the outline data, data indicative of the number (N) of segments of the character outline 46 represented by character data, and data indicative of the number (S) of the x-axis pixel lines x of the screen 50 (which number specifies the character size: e.g., "20" specifying the character size of 4.8 point). Then, the control flow goes to step S2 in which the coordinate calculating portion 38 of the CPU 12 calculates the coordinates of intersections between the arcuate stroke 44 of the character outline 46 and each x-axis pixel line x on the pixel screen 50, according to the rule described above. The calculation of the coordinates of the intersections begins with an arcuate segment C1 of the stroke 44 whose y-axis coordinate values are comparatively small. In the next step S3, the calculated x-axis coordinate values are stored in the COORDINATE memory 22, for each x-axis pixel line x. The intersections whose coordinates are stored in the memory 22 are indicated by black dots in FIG. 13. In this figure, each circle indicates an image dot to be formed at the appropriate picture element position. The white or non-hatched circles indicate the image dots to be formed in relation to the intersections whose coordinates are stored in the memory 22. As indicated in FIG. 14, the x-axis coordinate values of the intersections of each x-axis pixel line x are stored in the memory 22, in combination with and in relation to the y-axis coordinate value of the relevant pixel line x. The x-axis coordinate values are preceded by data indicative of the number of the intersections.

Figure 13:
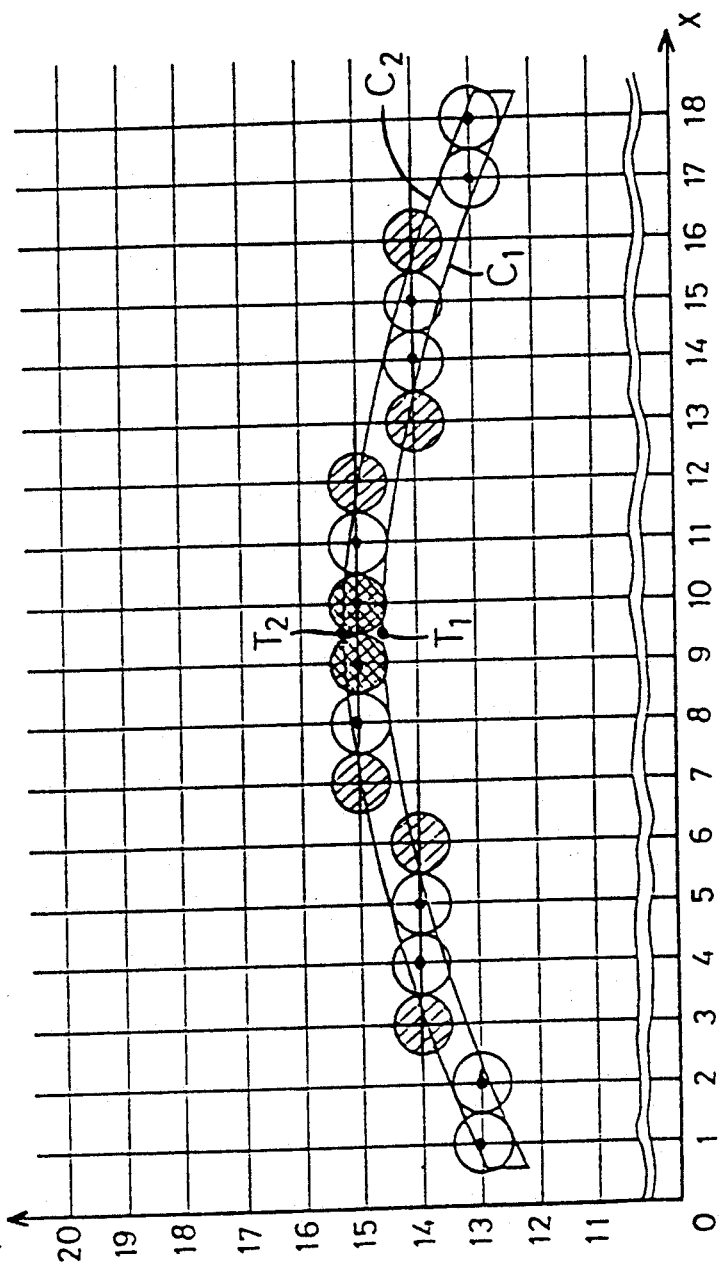
FIG. 13 is a view showing image dots formed for the stroke of FIG. 12.

The arcuate segment C1 of the outline 46 of the arcuate stroke 44 intersects the two x-axis pixel lines x whose y-axis coordinate values are "13" and "14", respectively. The segment C1 does not intersect the x-axis pixel line x whose y-axis coordinate value is "15". In this case, the coordinates of a maximal point T1 (which is the point whose y-axis coordinate value is the highest) of the arcuate segment C1 are calculated, from the coordinates of the start and end points of the segment C1 and the coordinates of the arc center of the segment. In this specific example, the x-axis pixel line x whose y-axis coordinate value is "15" is nearest to the maximal point T1 in the y-axis direction, of all the x-axis pixel lines x. Consequently, two intersections between the x-axis pixel line x whose y-axis coordinate value is "15" and the y-axis pixel lines y whose x-axis coordinate values are "9" and "10" are obtained as dummy intersections. The x-axis coordinate value "10" is larger than and nearest to the x-axis coordinate value of the maximal point T1, while the x-axis coordinate value "9" is smaller than and nearest to that of the maximal point T1. In step S3, these x-axis coordinate values "9" and "10" are stored in the COORDINATE memory 22, as the x-axis coordinate values of the two dummy intersections of the x-axis pixel line x whose y-axis coordinate value is "15". The x-axis coordinate values "9" and "10" are stored, together with maximal point data which indicates that the stored x-axis coordinate values "9" and "10" relate to the maximal point T1. Except for this maximal point data, the x-axis coordinate values "9" and "10" are treated in the same manner as the normal x-axis coordinate data of the normally obtained intersections. The two cross-hatched circles in FIG. 13 represent the two image dots formed in relation to the maximal point T1 or dummy intersections. It is noted that there are no intersections between the outline 46 of the stroke 44 and the x-axis pixel lines x whose y-axis coordinate values are "16" through "20".

The control flow then goes to step S4 to determine a difference between the x-axis coordinate values of the two intersections obtained with respect to each set of the adjacent two x-axis pixel lines. The difference is expressed by a direction and a distance from the x-axis coordinate of one of the two intersections which is obtained with respect to one of the two adjacent x-axis pixel lines x whose y-axis coordinate value is smaller than that of the other, to the x-axis coordinate of the other intersection which is obtained with respect to the other x-axis pixel line x whose y-axis coordinate value is larger. For example, a difference "+3" is obtained as the difference between the x-axis coordinate value "2" of the intersection obtained of the x-axis pixel line x whose y-axis coordinate value is "13" and the x-axis coordinate value "5" of the intersection obtained of the adjacent x-axis pixel line x whose y-axis coordinate value is "14". Similarly, a difference "−3" is obtained as the difference between the x-axis coordinate value "17" of the intersection obtained of the x-axis pixel line x whose y-axis coordinate value is "13" and the x-axis coordinate value "14" of the intersection obtained of the x-axis pixel line x whose y-axis coordinate value is "14". For the x-axis coordinate values "5" and "14" of the intersections obtained of the x-axis pixel lines x whose y-axis coordinate value is "14", the differences are obtained with respect to the x-axis coordinate value "9" of one of the two dummy intersections obtained of the x-axis pixel line x whose y-axis coordinate value is "15". The difference between the x-axis coordinate values "5" and "9" of the intersections obtained of the above two adjacent x-axis pixel lines is "+4", while the difference between the x-axis coordinate values "14" and "9" of the same two x-axis pixel lines x is "−5".

In step S5, the differences thus determined in step S4 are stored in the COORDINATE memory 22, in relation to the x-axis coordinate values of the intersections obtained of one of the two adjacent x-axis pixel lines x whose y-axis coordinate value is smaller than that of the other. For instance, the difference "+3" referred to above by way of example is stored in relation to the x-axis coordinate value "2" of the intersection between the arcuate segment C1 and the x-axis pixel line x whose y-axis coordinate value is "13".

After the determined differences are stored in the COORDINATE memory 22 in step S5, the control flow goes to step S6 to increment the count n of a counter which counts the number of the segments of the character outline 46 of the arcuate stroke 44 which have been subjected to the processing in steps S2–S5. Step S6 is followed by step S7 to determine whether the count n1 is equal to the value N (described above with respect to step S1), which represents the number of the segments of the outline 46 of the relevant character. Namely, step S7 is implemented to determine whether the x-axis coordinate values and the above-described differences of the intersections associated with all the segments of the character outline 46 have been calculated by the coordinate calculating portion 38 of the CPU 12, or not. If a negative decision (NO) is obtained in step S7, the control goes back to step S2, whereby steps S2–S7 are executed to calculate the x-axis coordinate values and the differences associated with the next segment.

In this specific case, steps S2–S7 are executed again for the next segment of the outline 46, that is, the right-hand side short straight segment, which is parallel to the Y-axis of the pixel screen 50. However, no intersections are obtained with respect to this short segment. In the present embodiment, provisions are made for avoiding the discontinuity at the end portion of the stroke 44, in the same manner as applied to the end portion of straight strokes of characters which will be described.

Then, steps S2–S7 are executed with respect to an arcuate segment C2 of the outline 46 of the stroke 44. In steps S2 and S3, the x-axis coordinate values of the intersections between the segment C2 and the x-axis pixel lines x are calculated and stored in the memory 22, in the same manner as applied to the arcuate segment C1. In this case, a maximal point T2 is obtained from the coordinates of the start and end point of the segment C2 and the coordinates of the arc center of the segment C2. Based on the coordinates of the maximal point T2, the two dummy intersections are determined. In this case, too, the two dummy intersections are obtained with respect to the x-axis pixel line x whose y-axis coordinate value is "15", whereby the x-axis coordinate values of the obtained dummy intersections are the same as obtained with respect to the maximal point T1 of the arcuate segment C1. Namely, the maximal points T1 and T2 are located on the opposite sides of the x-axis pixel line x whose y-axis coordinate value is "15", and are spaced apart from each other in the Y-axis direction by a distance smaller than a half of the size of the picture elements (length of each side of the square picture element).

Then, step S4 is executed with respect to the segment C2, to determine the differences between the x-axis coordinate values of the two intersections obtained with respect to each set of the two adjacent x-axis pixel lines x. In step S2, there are obtained four intersections with respect to the x-axis pixel line x whose y-axis coordinate value is "15", that is, two normal intersections obtained with respect to the arcuate segment C2, and two dummy intersections obtained with respect to the maximal point T2. In step S4, there are obtained a difference between the smaller one of the x-axis coordinate values of the two normal intersections and the smaller one of the x-axis coordinate values of the two dummy intersection, and a difference between the larger one of the x-axis coordinate values of the two normal intersections and the larger one of the x-axis coordinate values of the two dummy intersections. It is noted that no differences are obtained with respect to the dummy intersections. If the dummy intersections are not obtained with respect to the maximal point T2, no differences are obtained with respect to the normal intersections of the x-axis pixel line x whose y-axis coordinate value is "15".

Steps S2–S7 are repeatedly executed until the x-axis coordinates and the differences of the intersections of all the segments of the character outline 46 have been obtained and stored in the COORDINATE memory 22. That is, if the count n has been incremented to N, an affirmative decision (YES) is obtained in step S7, and the control flow goes to step S8 in which the x-axis coordinate values (including those of the dummy intersections) stored in the memory 22 in step S3 are ordered from the smallest to the largest, for each x-axis pixel line x, and the successive two values are paired, as indicated in FIG. 15. The coordinate values are calculated in step S2 for each of the segments of the outline 46 which are processed in the predetermined order. In this respect, it is noted that a segment of the outline 46 may be processed before another segment whose x-axis coordinate values are smaller than those of that first processed segment. In view of this possibility, step S8 is implemented. In the present laser printer, there are always an even number of intersections for each x-axis pixel line x which intersects the character outline, whereby each of the x-axis coordinate values of the adjacent two intersections can be paired. In preparing dot data corresponding to each x-axis pixel line x which intersects the character outline, the logical values of the dot data corresponding to the picture elements between each pair of two intersections are set to "1", in step S14 which will be described. In the present embodiment, the logical values of dot data corresponding to the picture elements corresponding to the pair of two intersections are also set to "1".

While the x-axis coordinate values are ordered from the smallest to the largest as described above, there is an exception with respect to the x-axis coordinate values of the dummy intersections. More particularly, the two x-axis coordinate values stored in the memory 22 together with the maximal point data are always paired, even if there exists an x-axis coordinate value which is intermediate between the two values of the dummy intersections. In the present example, the x-axis coordinate values "9" and "10" of the dummy intersections obtained with respect to the x-axis pixel line x whose y-axis coordinate value is "15" are paired, even though the value "9" is next to the smallest value "8". As indicated in FIG. 15, the value "8" is followed by the value "11", and the values "9" and "10" are paired as the second pair.

After the x-axis coordinate values of the obtained intersections have been ordered and paired in step S8, the control flow goes to step S9 to determine whether an image defined by image dots formed at the intersections whose x-axis coordinate values are stored in the memory 22 has a discontinuous portion as viewed in the X-axis direction. The image dots are formed by the image-forming bits of the dot data prepared in step S14 described later. If an affirmative decision (YES) is made in step S9, step S11 is implemented for the data modifying portion 39 of the CPU 12 to modify the stored x-axis coordinate values. The determination in step S9 is effected based on each stored pair of x-axis coordinate values of each x-axis pixel line x, and the pair of x-axis coordinate values of the adjacent pixel line x which includes the x-axis coordinate value with respect to which the difference of the smaller one of the x-axis coordinate values of said each pixel line x is obtained. The smaller x-axis coordinate value indicated above will be referred to as "start dot coordinate", and the larger x-axis coordinate of the same pair will be referred to as "end dot coordinate".

In the interest of easy understanding, the first pair of x-axis coordinate values of the x-axis pixel line x whose y-axis coordinate is smaller are represented by (x1, x1') while the second pair of x-axis coordinate values of the x-axis pixel line x whose y-axis coordinate value is larger are represented by (x2, x2'), and the difference between x1 and x2 is represented by $\Delta x1$. By checking the sign of the difference $\Delta x1$, determination can be made as to which one of x1 and x2 is larger. If the difference $\Delta x1$ is zero, i.e., if x1 and x2 are equal to each other, this indicates that the two x-axis coordinates x1 and x2 are next to each other in the Y-axis direction, and that this portion of the relevant character stroke is continuous. Accordingly, a negative decision (NO) is obtained in step S9.

Figure 17A:
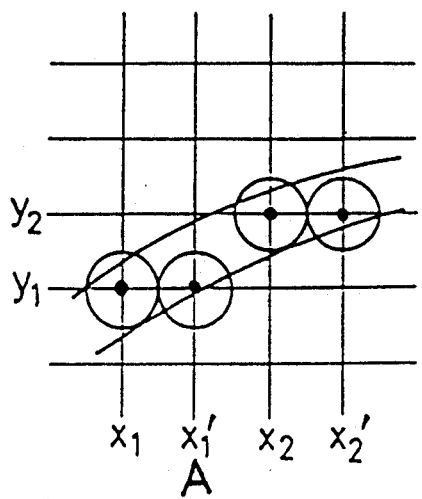
FIGS. 17(a) through 17(d) are illustrations for explaining the rules for checking dot-forming bits representative of a character stroke, for possible discontinuity of the stroke reproduced according to the dot-forming bits.

If the sign of the difference Δx1 is positive and the value x2 is larger than the value x1 as shown in FIG. 17(a), an x-axis coordinate "A" which is smaller by "1" than x2 is obtained according to the following equation (1):

$$A = x1 + |\Delta x1| - 1 \tag{1}$$

Then, determination is made as to whether the value x1' of the first pair is smaller than the value "A", or not. If the value x1' is not smaller than the value "A", this indicates that the coordinates x1' and x2 of the adjacent two x-axis pixel lines x are next to each other in the direction in which the outline of the relevant stroke extends, and that this portion of the stroke is continuous. In this case, no modification of the stored x-axis coordinate values is necessary.

Figure 17B:
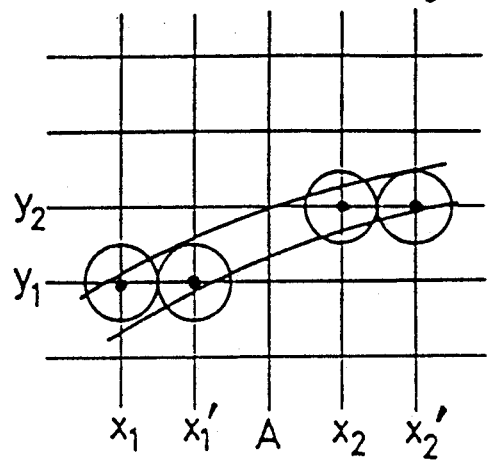

In the case of FIG. 17(b), the value x1' is smaller than "A", and no image-forming dot data bit is set for the picture element located between the x-axis coordinate values x1' and x2 in the X-axis direction. In this case, the stroke has a discontinuous portion, without an image dot formed between x1' and x2 in the direction of extension of the stroke. Accordingly, an affirmative decision (YES) is obtained in step S9, and the control flow goes to step S11 to modify the stored x-axis coordinate values. In step S11, one or both of the end dot coordinate x1' of the first pair and the start dot coordinate x2 of the second pair is/are modified. If the discontinuous portion is formed by only one non-imaged picture element between x1' and x2, the start dot coordinate x2 of the second pair is reduced to "A". If the discontinuous portion is formed by two or more non-imaged picture elements, the end dot coordinate x1' of the first pair and the start dot coordinate x2 of the second pair are both modified. If the number of the non-imaged picture elements is even, the values x1' and x2 are increased and reduced, respectively, by the same amount. If the number of the non-imaged picture elements is odd, the amount of reduction of the value x2 is larger by "1" than the amount of increase of the value x1'.

Figure 17C:
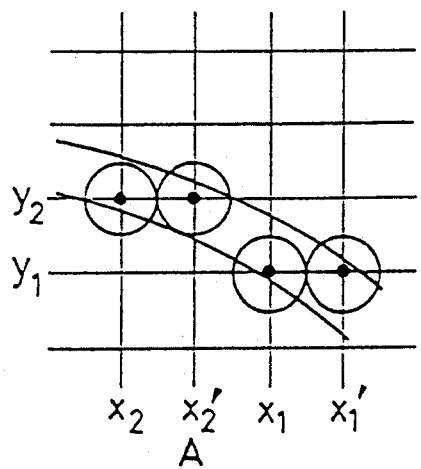

If the sign of the difference Δx1 is negative and the value x1 is larger than the value x2 as indicated in FIG. 17(c), a coordinate "A" which is smaller by "1" than the value x1 is obtained according to the following equation (2):

$$A = x2 + |\Delta x1| - 1 \tag{2}$$

Figure 17D:
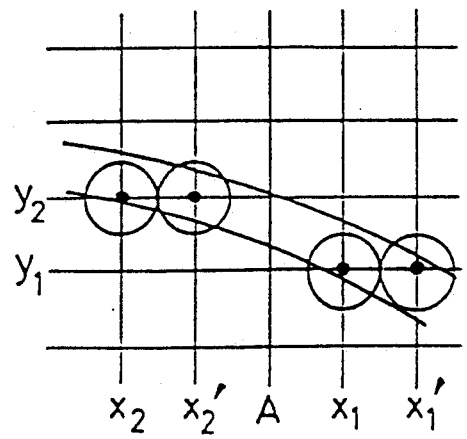

In this case, the values A and x2' are compared with each other. If the value x2' is not smaller than the value A as shown in FIG. 17(c), the decision in step S9 is negative (NO). If the value x2' is smaller than the value A as shown in FIG. 17(d), the stroke has a discontinuous portion, whereby the decision in step S9 is affirmative (YES). Accordingly, step S11 is implemented to modify the stored x-axis coordinate values. If the discontinuous portion is formed only one non-imaged picture elements between x2' and x1, the end dot coordinate x2' of the second pair is increased to "A". If the number of the non-imaged picture elements is even, the end dot coordinate x2' of the second pair and the start dot coordinate x1 of the first pair are increased and reduced by the same amount, respectively. If the number of the non-imaged picture elements is odd, the amount of increase of the end dot coordinate x2' is larger by "1" than the amount of reduction of the start dot coordinate x1.

The determination in step S9 is effected starting with the x-axis coordinate values of the x-axis pixel line x whose y-axis coordinate value is the smallest, and ending with the x-axis coordinate values of the pixel line x whose y-axis coordinate value is the largest. As described above, the two pairs (first and second pairs) of x-axis coordinate values with respect to which the determination in step S9 is effected are selected based on the difference of the smaller one of the x-axis coordinate values of the first pair (whose y-axis coordinate values are smaller than the second pair). Since the differences are stored in the memory 22 together with the x-axis coordinate values, the second pair can be determined based on the difference of the smaller one of the x-axis coordinate values of the first pair, even after the x-axis coordinate values and the differences are calculated in steps S2 and S4 and after the coordinate values are paired in step S8. For instance, suppose the first pair of x-axis coordinate values consists of (1, 2) of the pixel line x whose y-axis coordinate value is "13", the x-axis coordinate value "4" of the second pair (4, 5) can be determined by adding the difference "+3" of the smaller x-axis coordinate value "1" of the first pair (1, 2), to that coordinate value "1". Therefore, the pair (4, 5) including the value "4" is selected as the second pair associated with the relevant first pair (1, 2), when the determination in step S9 is effected with respect to these first and second pairs.

If the determination in step S9 reveals that the relevant stroke has a discontinuous portion, step S11 is executed to modify the appropriate x-axis coordinate values as explained above by reference to FIGS. 17(a) through 17(d). Then, the control flow goes to step S10 to increment a count n2, and step S11 to determine whether the count n2 is equal to "S", that is, determine whether the determination in step S9 has been completed for all pixel lines x. Steps S9–S12 are repeatedly executed until an affirmative decision (YES) is obtained in step S12. If the x-axis coordinate values are not followed by the differences, like the x-axis coordinate pair (9, 10) of the dummy intersections, a negative decision (NO) is obtained in step S9, and step S9 is followed by step S10.

Hatched circles in FIG. 13 show the image dots which are formed by the modified x-axis coordinate values. In FIG. 16, the modified values are indicated in bold stroke. The differences remaining in the memory 22 do not apply to the modified values, but are left unchanged since they are not subsequently used.

When the count n2 has become equal to "S", the control flow goes to step S13 in which the counts n1 and n2 are zeroed, and to step S14 in which the dot data for the relevant stroke are prepared by the dot data preparing portion 40 of the CPU 12, based on the x-axis coordinate values stored in the COORDINATE memory 22. The dot data is prepared one byte after another. The microcomputer 10 is capable of processing one byte of data at a time, namely, capable of preparing eight bits corresponding to respective eight picture elements at one time. The manner of setting the dot data bits is the same as described in co-pending U.S. patent application Ser. No. 07/425,604 filed Oct. 23, 1989 identified above.

Figure 18:
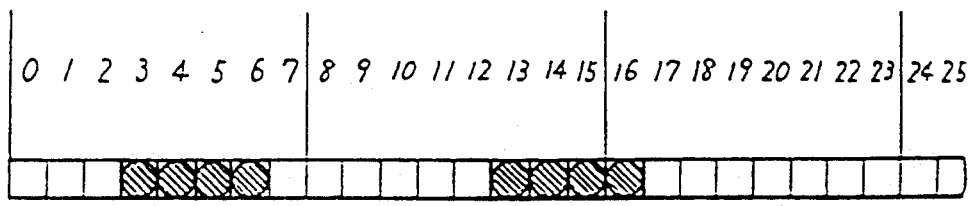
FIG. 18 is a view explaining the manner of preparing dot data according to the x-axis coordinate values of the intersections as indicated in FIG. 16.

Referring to FIG. 18, there will be described the method for processing the two pairs of x-axis coordinate values (3, 6) and (13, 16) of the x-axis pixel line x numbered whose y-axis coordinate value is "14", by way of example. It is noted that the x-axis coordinate values represent the positions of the appropriate picture elements on the pixel screen 50.

Initially, the end dot coordinate value "6" of the first pair (3, 6) is compared with x-axis coordinate value "7" corresponding to the last bit of the byte to which the bit corresponding to the start dot coordinate value "3" of the first pair belongs. Since the end dot coordinate value "6" is smaller than the value "7", the picture elements corresponding to the start and end dot coordinates "3" and "6" are judged to belong to a group of picture elements which corresponds to the first byte of the dot data. Therefore, the bits corresponding to the x-coordinate values "3" and "6" and the bits therebetween are set to "1" at one time, as indicated by hatched circles in FIG. 18.

Similarly, the end dot coordinate value "16" of the second pair (13, 16) is compared with a value "15" corresponding to the last bit of the byte to which the bit corresponding to the start dot coordinate value "13" belongs. In this case where the end dot coordinate value "16" is larger than the value "15", the start dot coordinate value "13" is subtracted from the end dot coordinate value "16", and a value "1" is added to the difference. Namely, the number of bits which are set to "1" based on the second pair of coordinate values (13, 16) is calculated. Then, the start dot coordinate value "13" is subtracted from the value "15" corresponding to the last bit of the second byte, and a value "1" is added to the obtained difference "2". The thus obtained value "3" represents the number of the picture elements which belong to the second group of eight picture elements (8 through 15) corresponding to the second byte and whose x-axis coordinate values are equal to or larger than that of the picture element corresponding to the start dot coordinate value "13". Accordingly, the three bits corresponding to the x-axis coordinate values "13" through "15" are set to "1" at one time. Then, the number of bytes corresponding to the remaining picture elements whose bits are set to "1" is calculated. Specifically, the value "15" corresponding to the last bit of the second byte is subtracted from the end dot coordinate value "16", and the obtained difference is divided by "8". In this specific case, only one picture element remains for the second pair of x-axis coordinate values (13, 16), and the first bit of the third byte which corresponds to the x-axis coordinate value "16" is set to "1".

The preparation of the dot data (setting of the dot data bits) in step S14 is accomplished based on the coordinate values as modified in step S11, whereby the stroke 44 reproduced according to the prepared dot data is formed by the image dots indicated by the hatched circles in FIG. 13, as well as the image dots indicated by the white and cross-hatched circles. Therefore, the reproduced stroke 44 does not have any discontinuous portion and assumes a continuously extending, generally arcuate shape. After the dot data for all the x-axis pixel lines x have been prepared, the data conversion routine of FIG. 3 is terminated, and the control flow goes to the main routine.

Figure 3:
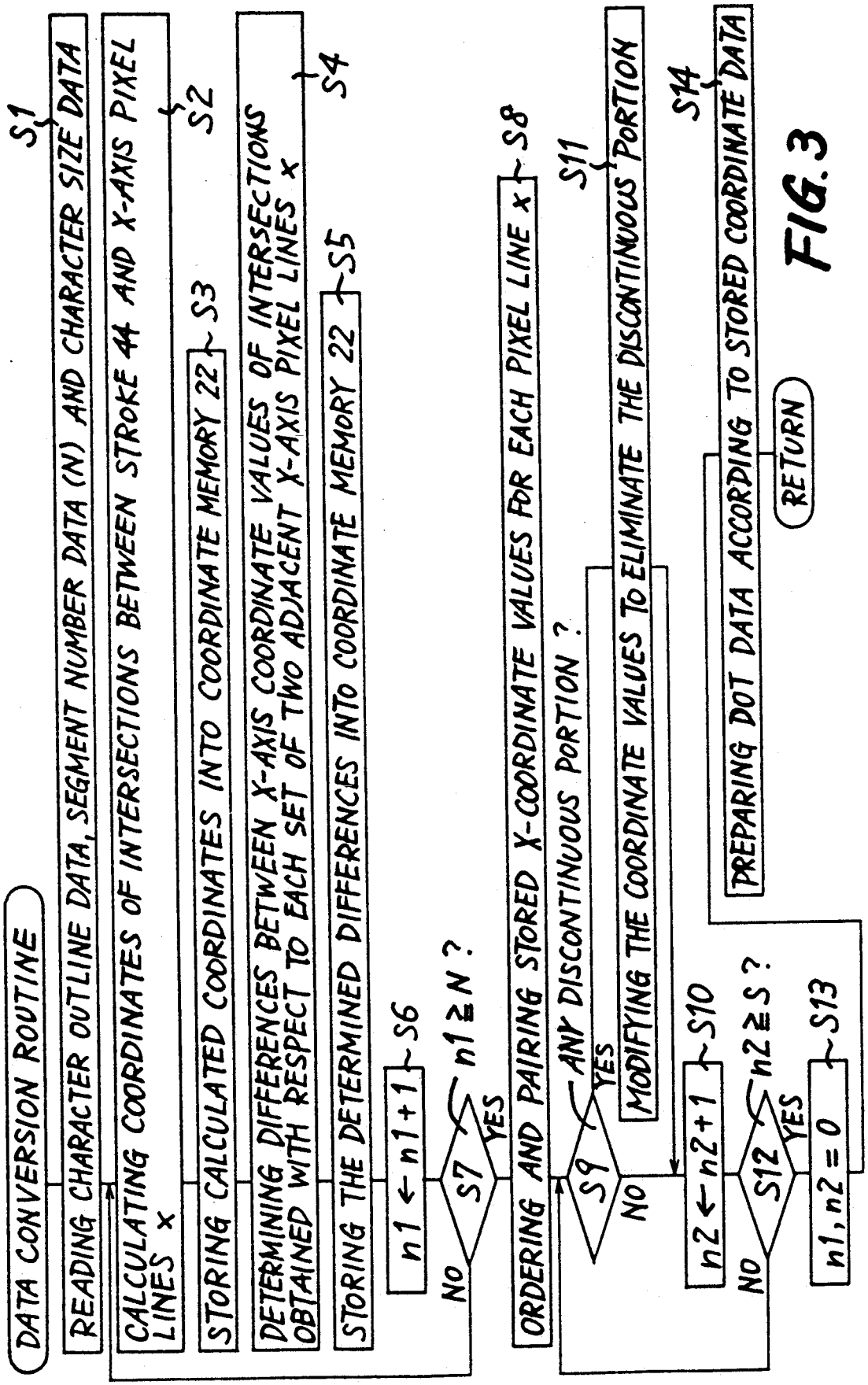
FIG. 3 is a flow chart illustrating a data conversion routine as one of control programs stored in a PROGRAM ROM of the control circuit.

It will be understood from the above description that means for preparing the dot data is constituted by the portions of the PROGRAM ROM 16 and the CPU 12 which are assigned to execute step S14 of the flow chart of FIG. 3. The dot data preparing portion 40 consists of the portion of the CPU 12 assigned to execute step S14. It will be further understood that discontinuity detecting means for detecting the presence of a discontinuous portion of a stroke of a character when reproduced according to the x-axis coordinate data stored in the COORDINATE memory 22 is constituted by the portions of the PROGRAM ROM 16 and the CPU 12 which are assigned to execute step S9. Further, discontinuity eliminating means for modifying the x-axis coordinate values once stored in the memory 22 is constituted by the portions of the PROGRAM ROM 16 and the CPU 12 which are assigned to execute step S11. The portions of the CPU 12 assigned to execute steps S4, S5, S9 and S11 constitute the data modifying portion 39. The portions of the ROM 16 and the CPU 12 assigned to execute steps S4 and S5 constitute relating means for storing in the memory 22 relation data indicative of the differences (distances and signs) between the adjacent two x-axis coordinate values taken along the segments of the character stroke. Further, the discontinuity detecting means indicated above includes pairing means for selecting two pairs of intersections with respect to which the determination in step S9 is effected.

Figure 19:
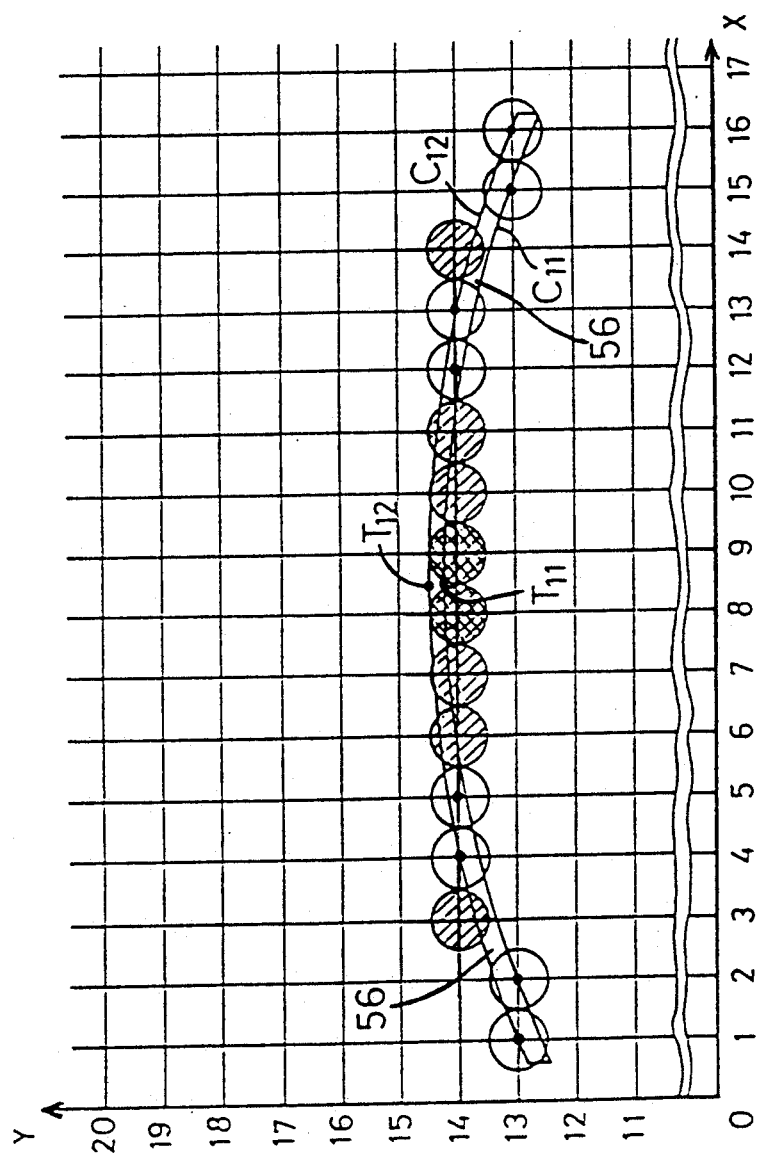
FIGS. 19 and 20 are views illustrating modified methods of preparing dot-forming bits for arcuate strokes of characters.

In the above example of FIG. 13, the maximal points T1 and T2 of the two arcuate segments C1 and C2 of the stroke 44 are located on the opposite sides of the x-axis pixel line x whose y-axis coordinate value is "15", and the two dummy intersections or x-axis coordinate values are the same for the two maximal points T1 and T2. In the case of a relatively narrow arcuate stroke 56 as shown in FIG. 19, maximal values T11 and T12 of arcuate segments C11 and C12 are located between the adjacent two x-axis pixel lines x whose y-axis coordinate values are "14" and "15", and two dummy x-axis coordinate values (8, 9) are prepared as those of the x-axis pixel line whose y-axis coordinate value is "14". In this case, the determination in step S9 is effected for the pair (4, 5) and the dummy pair (8, 9), and for the pair (12, 13) and the dummy pair (8, 9). As a result of the modification of the x-axis coordinate data in step S11, the dot data bits corresponding to the x-axis coordinate values "6", "7", "10" and "11" are set to "1", as indicated by hatched circles in FIG. 19.

Figure 20:
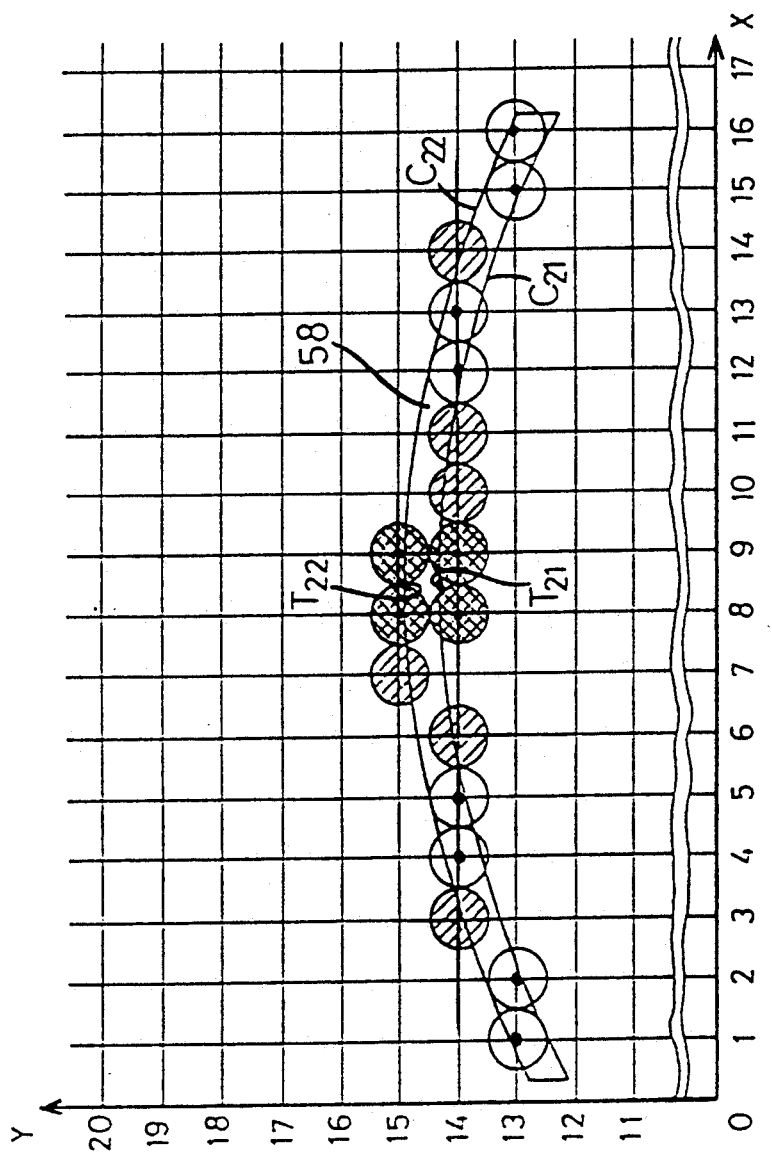

In the case of an arcuate stroke 58 as shown in FIG. 20, a maximal point T21 of the arcuate segment C21 is located nearer to the pixel line x whose y-axis coordinate value is "14", while a maximal point T22 of the arcuate segment C22 is located nearer to the pixel line x whose y-axis coordinate value is "15". In this case, two dummy x-axis coordinate values (8, 9) are obtained for the x-axis pixel line x whose y-axis coordinate value is "14", and also for the pixel line x whose y-axis coordinate value is "15". The determination in step S9 is effected for the pair of x-axis coordinate values (12, 13) and the dummy x-axis coordinate values (8, 9) of the pixel line x whose y-axis coordinate value is "14". The determination is also effected for the pair of coordinate values (4, 5) of the pixel line x whose y-axis coordinate value is "14", and the dummy coordinate values (8, 9) of the pixel line x whose y-axis coordinate value is "15". As a result of the modification of the coordinate data in step S11, the dot data bits corresponding to the x-axis coordinate values "6", "7", "10" and "11" are set to "1", as indicated by hatched circles in FIG. 20.

Figure 21A:
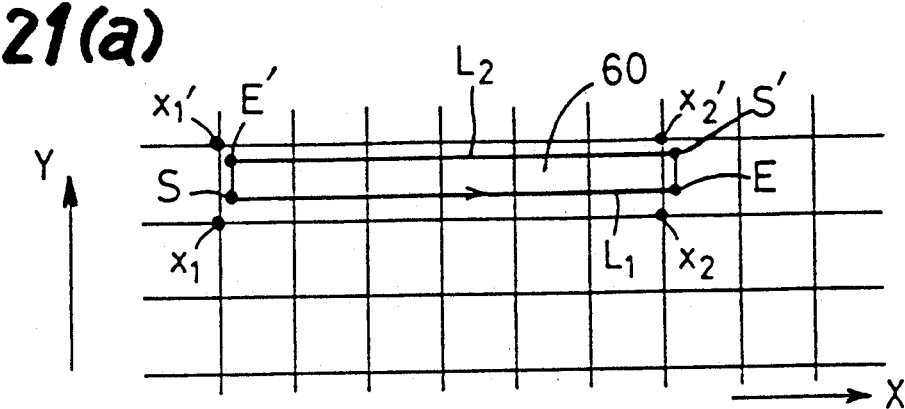
FIGS. 21–26 are views showing modified methods of eliminating discontinuous portions of various strokes of characters.
Figure 21B:
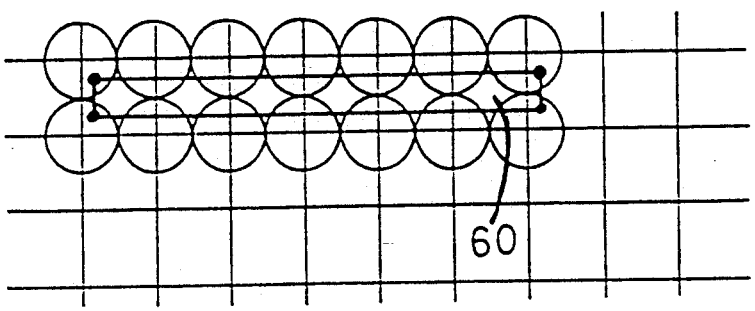

In the case of a horizontal straight stroke 60 of FIG. 21(a) which extends parallel to the x-axis pixel lines x and which is located between the two adjacent pixel lines x, the appropriate dot data bits are prepared in the following manner. In this case, no intersections between the pixel lines x and the stroke 60 exist. Therefore, in step S2 of the control routine of FIG. 3, x-axis coordinate values x1 and x2 of the centers of the two picture elements which are nearest to a start point S and an end point E of a segment L1 of the stroke 60 are determined as two dummy x-axis coordinate values. In step S3, the determined dummy coordinate values x1 and x2 are stored in the COORDINATE memory 22. Since the segment L1 is parallel to the x-axis pixel lines x, the dummy points having the x-axis coordinate values x1 and x2 have the same y-axis coordinate value. The smaller dummy x-axis coordinate value x1 is the start dot coordinate, while the larger dummy x-axis coordinate value x2 is the end dot coordinate. Therefore, there is no discontinuous portion with respect to the segment L1, and the differences $\Delta x1$ and $\Delta x2$ for the dummy x-axis coordinate values x1, x2 are set to zero. Similarly, the x-axis coordinate values x2' and x1' of the picture elements which are nearest to start and end points S' and E' of another long segment L2 of the stroke 60 are determined as two dummy x-axis coordinate values, which are stored in the memory 22. For these dummy values, the differences $\Delta x1'$ and $\Delta x2'$ are also set to zero. In step S8, the dummy values x1 and x2 are paired, and the dummy values x1' and x2' are paired. In this case, a negative decision (NO) is obtained in step S9, and the image dots are formed according to the dot data prepared in step S14, as illustrated in FIG. 21(b). While the dummy x-axis coordinate values x1 and x2 for the segment L1 and the dummy x-axis coordinate values x1' and x2' for the segment L2 line on the adjacent two x-axis pixel lines x, the dummy points for the two segments L1 and L2 may be provided on the same x-axis pixel line x. In this case, the stroke 60 as reproduced according to the prepared dot data has a width corresponding to the size of the picture elements.

Figure 22A:
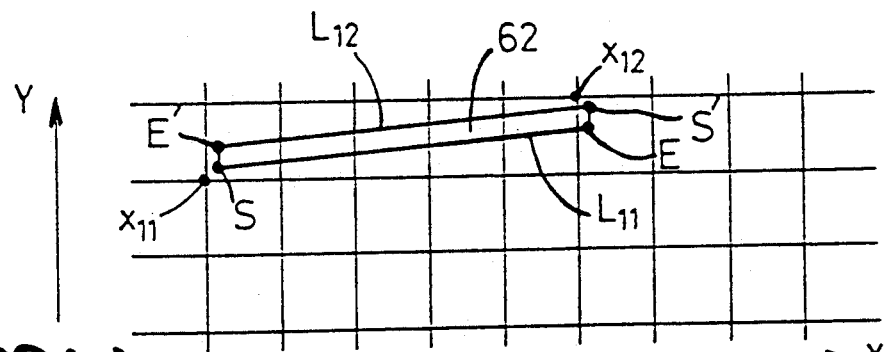
Figure 22B:
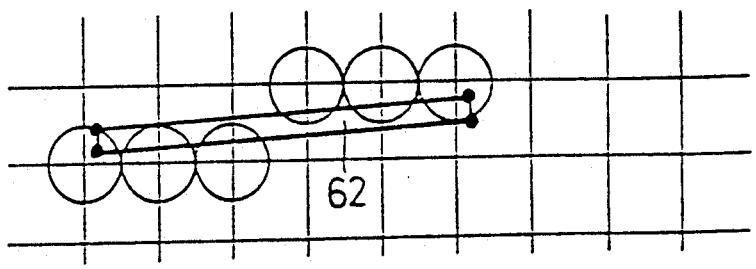

In the case of an inclined straight stroke 62 of FIG. 22(a) which is located between the adjacent two x-axis pixel lines x and which is inclined with respect to the pixel lines x, the x-axis coordinate values x11 and x12 of the picture elements which are nearest to start points S, S' and end points E, E' of two long straight segments L11, L12 are determined as two dummy coordinate values. Namely, the start point S of the segment L11 is nearest to the picture element having the x-axis coordinate value x11 on one of the two adjacent pixel lines x, while the end point E of the same segment L11 is nearest to the picture element having the x-axis coordinate value x12 on the other of the two adjacent pixel lines x. Similarly, the start and end points S' and E' of the segment L12 are nearest to the picture elements located on the two adjacent pixel lines x. In step S3, the two x-axis coordinate values x11 corresponding to the start point S of the segment L11 are stored as a pair of dummy values (x11, x11) in the memory 22, while the two x-axis coordinate values x12 corresponding to the end point E are stored as a pair of dummy values (x12, x12) in the memory 22. In step S5, a difference between the values x11 and x12 is stored in the memory 22. Similar processing is performed for the segment L12. In step S9, the determination is effected with respect to the dummy values (x11, x11) and the dummy values (x12, x12), in the same manner as described above, so that the stored dummy x-axis coordinate values are modified in step S11 when appropriate. If the modification is made, one of the dummy values (x11, x11) corresponding to the start point S, S' is modified as the start dot coordinate value, and one of the dummy values (x12, x12) corresponding to the end point E, E' is modified as the end dot coordinate value. For this reason, the two dummy values x11, x11, or x12, x12 are stored with respect to the respective adjacent two pixel lines x. However, one of the dummy values x11, x11 (or x12, x12) may be replaced by another x-axis coordinate value. Image dots formed according to the modified dummy x-axis coordinate data are indicated in FIG. 22(b).

Figure 23A:
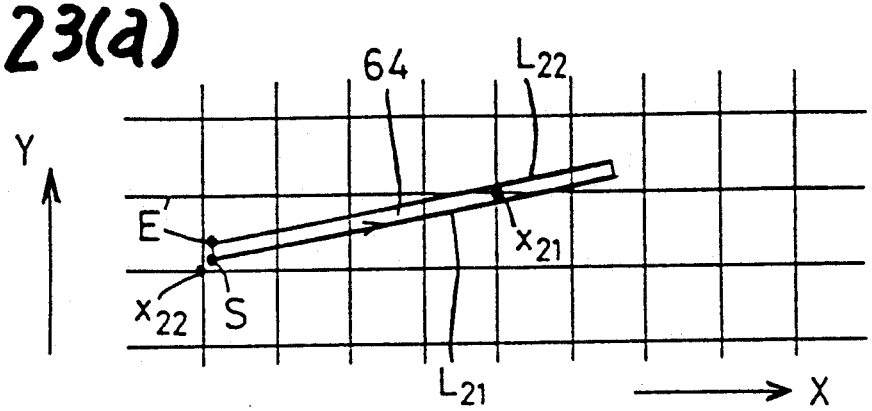
Figure 23B:
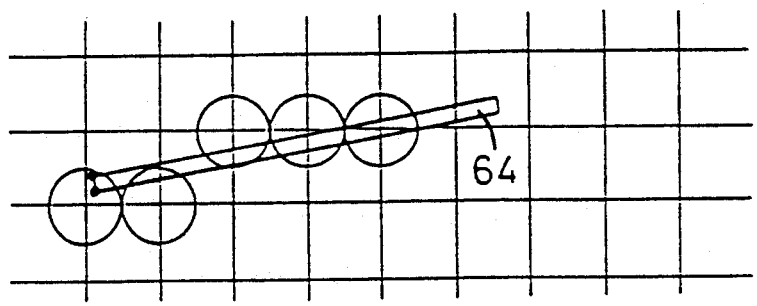

In the case of a narrow inclined straight stroke 64 of FIG. 23(a) which intersects one of the pixel lines x, an x-axis coordinate value x21 of the intersection between the pixel line x and a segment L21 of the stroke is obtained. Then, an x-axis coordinate value x22 of the picture element which is nearest to the start point S of the segment L21 is obtained. Then, determination is made as to whether a distance in the X-axis direction between the values x21 and x22 exceeds a predetermined value (equivalent to 1.5 times the size of the picture elements, in this specific example). If the distance is smaller than the 1.5 times the size of the picture elements, no modification in step S11 is required, and the x-axis coordinate values x21 and x22 are stored in the memory 22 in step S3. If the distance is larger than the predetermined value, two x-axis coordinate values x22, x22 are stored in the memory 22, and a difference between x22 and x21 is calculated and stored, irrespective of whether the values x22 and x21 are on the same pixel line x or on the respective two adjacent pixel lines x. For the segment L22 of the stroke 64, too, determination is made as to whether a distance between the x-axis coordinate value x21 of the intersection and the x-axis coordinate value x22 of the picture element nearest to the end point E' is larger than the predetermined value, or not. If the distance is larger than the predetermined value, two x-axis coordinate values x22, x22 are stored in the memory 22, and the difference between the values x22 and x21 is calculated and stored. In step S9, the determination is effected with respect to the pair of x-axis coordinate values (x22, x22) and the pair of x-axis coordinate values (x21, x21). In this case, an affirmative decision (YES) is obtained in step S9, and the coordinate values stored in the memory 22 are modified in step S11, so that image dots are formed at the picture element positions between the x-axis coordinate values x21, x22, as shown in FIG. 23(b).

Figure 24A:
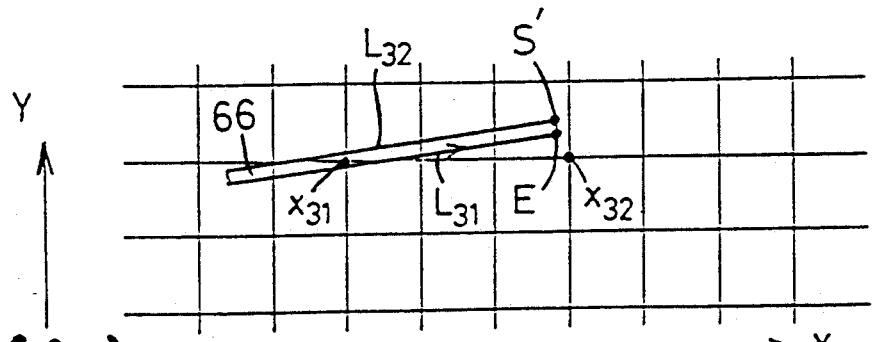
Figure 24B:
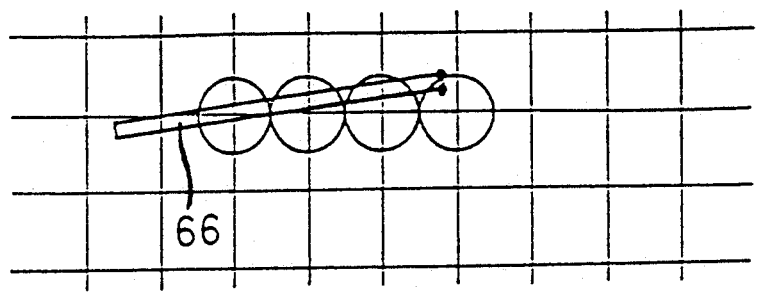

In the case of a narrow inclined straight stroke 66 of FIG. 24(a) which intersects an x-axis pixel line x, like the stroke 64 of FIG. 23(a), the same processing is effected with respect to the end point E of the segment L31 and the start point S' of the segment L32. In this case, image dots are formed as indicated in FIG. 24(b).

Figure 25A:
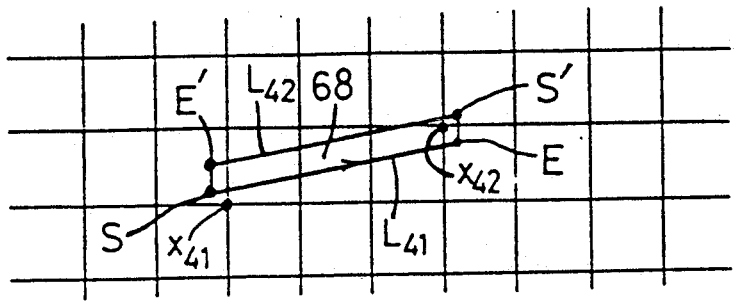
Figure 25B:
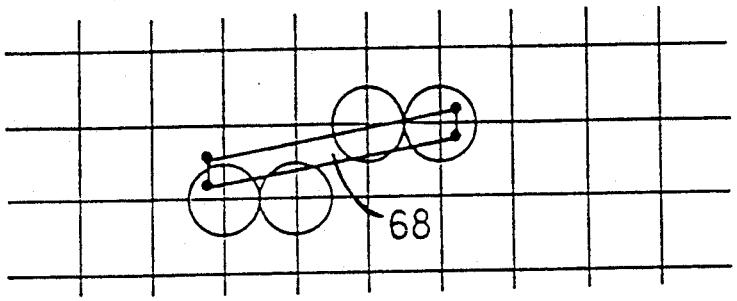

In the case of an inclined straight stroke 68 as shown in FIG. 25(a), the segment L41 does not intersect any pixel line x, while the other segment L42 intersects only one pixel line x. This case is handled in the following manner. For the segment L41 which does not intersect the pixel lines x, dummy x-axis coordinate values x41 and x42 are obtained with respect to the start and end points S and E, in the same manner as described above in the cases of FIGS. 21 and 22. For the segment L42 intersecting one x-axis pixel line x, an x-axis coordinate value x42 of an intersection between the segment L42 and the appropriate x-axis pixel line x is first obtained. Then, x-axis coordinate values x42, x41 of the centers of the picture elements nearest to the start and end points S', E' of the segment L42 are obtained as two dummy x-axis coordinate values. X-axis distances of the dummy x-axis coordinate values x41, x42 to the x-axis coordinate value x42 of the intersection between the segment L42 and the pixel line x are calculated, and compared with a predetermined value. In this example, the distance between x41 and x42 is larger than the predetermined value, two x-axis coordinate values x41, x41 are stored in the memory 22, and a difference Δx41 of the value x41 with respect to the value x42 is also stored. In step S9, the determination is effected with respect to the pair of x-axis coordinate values (x41, x41) and the pair of x-axis coordinate values (x42, x42). In step S11, these stored x-axis coordinate values are modified, so that image dots are formed according to the dot data prepared from the modified coordinate values, as indicated in FIG. 25(b).

Figure 26A:
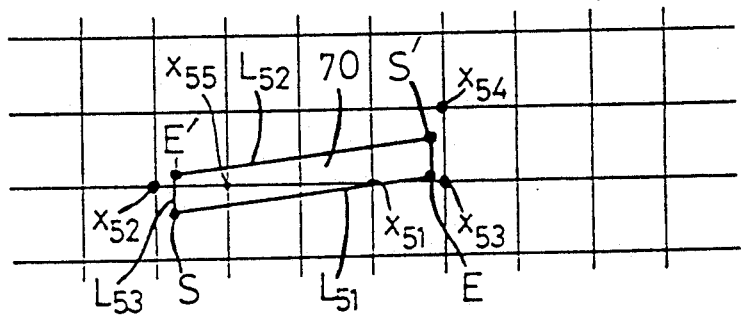
Figure 26B:
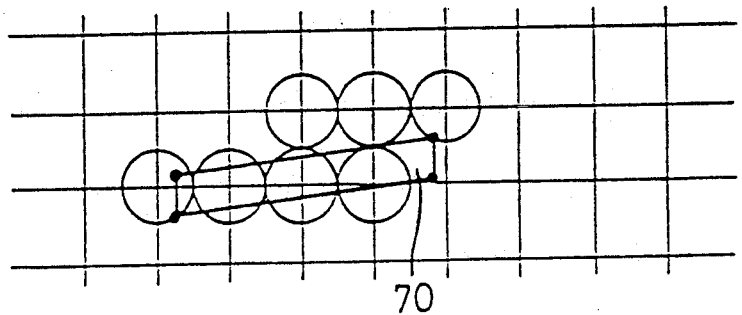

FIG. 26(a) shows an inclined straight stroke 70 which has two opposite segments L51, L52 inclined with respect to the x-axis pixel lines x. The inclined segment L51 whose y-axis coordinate value is smaller than that of the segment L52 intersects only one x-axis pixel line x, while the segment L52 is located between the adjacent two pixel lines x. In this case, the same processing as applied to the stroke 68 of FIG. 25(a) is performed. An x-axis coordinate value x51 of an intersection between the segment L51 and the x-axis pixel line x is compared with x-axis coordinate values x52 and x53 obtained with respect to the start and end points S and E of the segment L51, respectively. Since the distance between x51 and x53 in the X-axis direction is smaller than the predetermined value (1.5 times the size of the picture elements), a negative decision (NO) is obtained in step S9, and the modification in step S11 is not effected for the portion of the stroke 70 on the side of the end point E. On the other hand, an affirmative decision (YES) is obtained in step S9, and the modification in step S11 is effected for the portion of the stroke 70 on the side of the start point S. Accordingly, two x-axis coordinate values x52, x52 are stored, and a difference Δx52 of the value x52 with respect to the value x51 is calculated and stored. For the other segment L52, two x-axis coordinate values x52 obtained with respect to the start point S', and two x-axis coordinate values x54 obtained with respect to the end point E' are stored, and a difference Δx52 of the value x52 with respect to the value x54 is calculated and stored. In step S9, the determination is made with respect to the pair of x-axis coordinate values (x52, x52) and the pair of x-axis coordinate values (x54, x54), and with respect to the pair of x-axis coordinate values (x52, x52) and the pair of x-axis coordinate values (x55, x51). The x-axis coordinate value x55 is obtained as the x-axis coordinate values of an intersection between the pixel line x and the segment L53 which is parallel to the y-axis pixel lines. Based on the difference Δx52 with respect to the value x51, the value x55 is selected as the value which is compared with one of the two values x52 in step S9. As a result of the determination in step S9, the stored x-axis coordinate values are modified in step S11, so that image dots are formed as indicated in FIG. 26(b), according to the dot data prepared from the modified values.

While there have been described the various manners of detecting a discontinuous portion of a character stroke as defined by image dots and modifying the x-axis coordinate values of the normal and dummy intersections between the x-axis pixel lines x and the outline segments of the stroke, it is to be understood that the determination in step S9 and the modification in step S11 may be otherwise accomplished. For example, the x-axis coordinate values of the intersections of each relevant x-axis pixel line x are modified, irrespective of the number of non-imaged picture elements between each pair of the intersections.

In some of the illustrated examples, the narrow strokes having a width smaller than the side of the picture elements are defined by two arrays of image dots formed according to the dot data prepared from the modified x-axis coordinate values of the normal and/or dummy intersections. However, the modification may be made so that such strokes are defined by a single array of image dots.

In the illustrated embodiments, the differences of the x-axis coordinate values on one x-axis pixel line x with respect to those on the adjacent pixel line x are calculated after the x-axis coordinate values of the normal and dummy intersections are calculated and stored. However, the calculation of the differences may be effected when the x-axis coordinate values are calculated and stored. More specifically, when the x-axis coordinate values of intersections between each segment of a character stroke and the pixel lines x are obtained in the direction from the start point of the segment toward the end point, the difference between the x-axis coordinates of the intersections of each pair of the adjacent two intersections is calculated. In this case, each pair of x-axis coordinate values whose difference is calculated is also stored in the memory 22, so as to determine whether there exists a discontinuous portion between the two intersections which has the pair of x-axis coordinate values whose difference is stored. Namely, the x-axis coordinate values of each pair of adjacent two intersections of each outline segment of the stroke is stored, and the discontinuous length between the adjacent two intersections is represented by the difference also stored in the memory. In this arrangement, therefore, the determination in step S9 may be readily made even after the calculated x-axis coordinate values are ordered and paired in step S8.

In the illustrated embodiments, the x-axis coordinate values of the intersections of the x-axis pixel lines with respect to the outline of a character stroke are stored in relation to the y-axis coordinate values of the x-axis pixel lines. However, the y-axis coordinate values of the intersection of the y-axis pixel lines y with respect to the outline of the stroke may be stored in relation to the x-axis coordinate values of the y-axis pixel lines y. Further, scanning straight lines other than the x-axis and y-axis pixel lines x, y may be used.

In the illustrated embodiments, two x-axis coordinate values of each x-axis pixel line x which intersects one or more portions of the outline of a character stroke are obtained so that the two x-axis coordinate values define the respective start and end picture elements between which image dots are formed. The conversion of the outline data representative of the stroke outline is converted into the corresponding dot data such that the dot data bits corresponding to the picture elements between the start and end picture elements are set to "1" at one time. However, the principle of the present invention may be practiced where the conversion of the outline data into the dot data is otherwise effected. For instance, a dot data bit is set to "1" if a part of the area of the corresponding picture element which lies within the outline of the stroke exceeds a predetermined ratio. In this case, the image dot represented by the dot-forming bit "1" is not formed if the part of the area of the picture element lying within the stroke outline is smaller than the predetermined ratio. Accordingly, the stroke reproduced according to the prepared dot data may have a discontinuous portion or portions, which are detected and eliminated according to the principle of the present invention.

It is possible that the determination in step S9 and the modification in step S11 may be implemented only where the selected character size (represented by the number S of the x-axis pixel lines x) is 12 point or smaller.

Further, the outline data may consist solely of the coordinates of outline segments of a stroke or strokes of a character. Where the outline of a stroke is defined by a plurality of straight segments, the outline data consists of groups of coordinate data representative of the respective straight segments. Where the outline of a stroke includes a curved segment, the curved segment is defined by groups of coordinate data representative of a plurality of points which are concatenated to define the curved segment.

While the manner of determining the dummy intersections of upwardly arcuate segments of a stroke outline based on the coordinates of the maximal points of the arcuate segments have been described with reference to FIGS. 13, 19 and 20, it will be understood from the foregoing description that the same rule as applied to the examples of FIGS. 13, 19 and 20 is applicable to the determination of the dummy intersections of downwardly arcuate segments of a stroke outline as shown in FIG. 27. In the example of FIG. 27, coordinates of minimal points T31 and T32 are determined for the respective downwardly arcuate segments C31 and C32, and respective pairs of dummy intersections are determined and used in the same manner as described above with respect to the example of FIG. 13.

It will be understood that the present invention may apply to a printer other than a laser printer as described above, and may also apply to a device other than a printer, which requires conversion of outline data of characters such as letters, symbols and other visible representations into corresponding dot data.

It will be obvious that the present invention may be embodied with various other changes, modifications and improvements, which may occur to those skilled in the art, without departing from the spirit and scope of the invention defined in the following claims.

What is claimed is:

1. A data converting apparatus comprising:
   dot data preparing means for converting, according to a predetermined rule, a batch of outline data stored in a memory and representative of an outline of a visible representation such as a letter, a symbol and a graphical representation to be formed by a series of strokes, into a batch of dot data comprising dot-forming bits indicative of image dots to be formed at positions of respective picture elements which correspond to each stroke of the visible representation;
   discontinuity detecting means for detecting a discontinuous portion of said each stroke as defined by said image dots to be formed according to said dot-forming bits by checking said dot-forming bits to determine whether said image dots represented by said dot-forming bits are discontinuous along the outline of said each stroke; and
   discontinuity eliminating means responsive to said discontinuity detecting means, for processing said outline data before said outline data are converted into said dot data, such that said dot data prepared by said dot data preparing means include dot-forming bits indicative of image dots to be formed at positions of respective picture elements which correspond to said discontinuous portion.

2. A data converting apparatus according to claim 1, further comprising:
   coordinate calculating means for superimposing said outline of each of said strokes on a coordinated pixel screen in which said picture elements are defined by a plurality of parallel x-axis pixel lines intersecting said x-axis pixel lines, one of said plurality of x-axis pixel lines and said plurality of y-axis pixel lines and a plurality of parallel y-axis pixel lines functioning as a plurality of scanning lines, said coordinate calculating means calculating, for each of said strokes, coordinates of intersections between said outline of the stroke and each of said scanning lines which intersects the stroke, said intersections comprising at least one pair of intersections, each intersection pair consisting of two intersections representing a start dot and an end dot between which said image dots are formed; and
   coordinate memory means for storing said calculated coordinates of said intersections,
   and wherein said dot data preparing means prepares said dot data based on said calculated coordinates of said intersections, and said discontinuity detecting means detects said discontinuous portion, based on said calculated coordinates stored in said coordinate memory means.

3. A data converting apparatus according to claim 2, wherein said outline of each of said strokes consists of a plurality of segments, and said two intersections corresponding to a start dot and an end dot consist of an intersection between one of said scanning lines and a first one of said plurality of segments, and an intersection between said one of said scanning lines and a second one of said segments.

4. A data converting apparatus according to claim 3, wherein said coordinate memory means stores the coordinates of said intersections for each of said scanning lines which intersects outline of said each of said strokes, said apparatus further comprising means for ordering the stored coordinates in the order of magnitude of the coordinates and pairing the ordered coordinates of said intersections in said order as said at least one pair of intersections, according to said predetermined rule followed by said dot data preparing means.

5. A data converting apparatus according to claim 3, wherein said predetermined rule followed by said dot data preparing means consists of a rule according to which said dot-forming bits are set for each of the picture elements which correspond to said start dot and said end dot, and the picture elements between said start and end dots.

6. A data converting apparatus according to claim 3 having a plurality of pairs of intersections, each intersection pair consisting of said two intersections representing a start dot and an end dot, said plurality of pairs of intersections including two pairs of intersections which are adjacent to each other in a direction of extension of each of said strokes.

7. A data converting apparatus according to claim 6, wherein said coordinate calculating means calculates the coordinates of the intersections between each of said scanning lines and each of said plurality of segments of each of said strokes, in a predetermined direction along said outline of each of said strokes, said apparatus further comprising relating means for preparing relation data indicative of a relation between two coordinates which are calculated successively by said coordinate calculating means, and for storing in said coordinate memory said relation data in relation to a first one of said two coordinates.

8. A data converting apparatus according to claim 7, wherein said relating means comprises distance calculating means for calculating a distance between said two coordinates in a direction of extension of said scanning lines, and for storing in said coordinate memory distance data indicative of the calculated distance, in relation to said one of said two coordinates.

9. A data converting apparatus according to claim 8, wherein said discontinuity detecting means comprises pairing means for determining said two coordinates, based on said distance data and said first one of said two coordinates.

10. A data converting apparatus according to claim 9, wherein said pairing means determines a second one of said two coordinates, based on a sum of said distance and said first one of said two coordinates.

11. A data converting apparatus according to claim 6, wherein said discontinuity detecting means determines whether there exists a difference, corresponding to at least two picture elements, between the coordinates of the one of said two pairs of intersections which corresponds to said start dot, and the coordinates of the other of said two pairs of intersections which corresponds to said end dot, said discontinuity detecting means detecting said discontinuous portion if said discontinuity detecting means determines that there exists said difference.

12. A data converting apparatus according to claim 6, wherein said discontinuity detecting means detects said discontinuous portion based on said two pairs of intersections which are adjacent to each other, and said discontinuity eliminating means comprises data modifying means responsive to said discontinuity detecting means, for modifying the coordinates of at least one of the two intersections of at least one of said two pairs of intersections, to shift at least one of said start and end dots represented by the coordinates of said two pairs of intersections in a direction parallel to said scanning lines, so as to prepare said dot-forming bits corresponding to the picture elements corresponding to said discontinuous portion.

13. A data converting apparatus according to claim 12, wherein said discontinuity detecting means detects said discontinuous portion if a distance between said end dot represented by the coordinates of a first one of said two intersections of a first one of said two pairs of intersections and said start dot represented by the coordinates of a second one of said two intersections of a second one of said two pairs of intersections is larger than a predetermined value, said distance being measured in the direction parallel to said scanning lines.

14. A data converting means according to claim 13, wherein said discontinuity eliminating means determines, depending upon said distance, the number of said at least one of said start and end dots which is shifted by modification of the corresponding coordinates by said data modifying means.

15. A data converting means according to claim 13, further comprising means for calculating a difference in the direction parallel to said scanning lines, between the coordinate of a first one of said two intersections of a first one of said two pairs of intersections and the coordinate of a corresponding one of said two intersections of a second one of said two pairs of intersections, and a sign of said difference as viewed in a direction of scanning of said scanning lines, said discontinuity eliminating means determining, depending upon said sign, a direction in which the coordinates of at least one of the two intersections of said two pairs of intersections are modified.

16. A data converting apparatus according to claim 3, wherein said plurality of segments include an arcuate segment having one of a maximal and a minimal point, and said at least one pair of intersections comprise a pair of dummy intersections which are located at positions of the respective picture elements adjacent to said one of maximal and minimal points, said coordinate calculating means calculating the coordinates of said pair of dummy intersections.

17. A data converting apparatus according to claim 16, wherein said at least one pair of intersections further include a pair of intersections whose coordinates in a direction perpendicular to said scanning lines are the same as the coordinates of said pair of dummy intersections, and said discontinuity detecting means detects said discontinuous portion based on said pair of intersections and said pair of dummy intersections.

18. A data converting apparatus accorrding to claim 3, wherein said plurality of segments include two arcuate segments each having a maximal and a minimal point, and said at least one pair of intersections comprise two pairs of dummy intersections which are located at positions of the respective picture elements adjacent to the two maximal or minimal points of said two arcuate segments, respectively, said coordinate calculating means calculating the coordinates of said two pairs of dummy intersections, said two pairs of dummy intersections having different coordinates in a direction perpendicular to said scanning lines, said at least one pair of intersections further include first and second pairs of intersections which are located on opposite sides of said two pairs of dummy intersections as viewed along said scanning lines, said discontinuity detecting means detects said discontinuous portion based on a first one of said two pairs of dummy intersections a first one of said first and second pairs of intersections, and based on a second one of said two pairs of dummy intersections and a second one of said first and second pairs of intersections.

19. A data converting apparatus according to claim 3, wherein said coordinate calculating means calculates the coordinates of dummy intersections which are located at positions of the respective picture elements nearest to a start point and an end point of the outline of each of said strokes, and if a stroke does not intersect any of said plurality of scanning lines, said dot data preparing means prepares said dot data based on the coordinates of said dummy intersections, and said discontinuity detecting means detects said discontinuous portion based on the coordinates of said dummy intersections.

20. A data converting apparatus according to claim 3, wherein said coordinate calculating means calculates the coordinates of a dummy intersection located at a position of the picture element nearest to one of a start point and an end point of the outline of each of said srokes, and if a stroke intersects only one of said scanning lines, said dot data preparing means prepares said dot data and said discontinuity detecting means detects said discontinuous portion based on the coordinates of said dummy intersection and the intersection between said outline of the stroke and said one scanning line.

21. A data converting apparatus according to claim 3, wherein said plurality of segments includes two straight segments which define a width of one of said strokes, one of said two straight segments intersecting only one of said scanning lines while the other of said two straight segments intersects none of said scanning lines, said coordinate calculating means calculates the coordinates of dummy intersections located at positions of the respective picture elements nearest to a start point and an end point of said two straight segments, and said dot data preparing means prepares said dot data and said discontinuity detecting means detects said discontinuous portion, based on the coordinates of said dummy intersections and the coordinates of an intersection between said one straight segment and said one scanning line.

22. A data converting apparatus having dot data preparing means for converting, accorrding to a predetermined rule, a batch of outline data stored in a memory and representative of an outline of a visible representation such as a letter, a symbol and a graphical representation to be formed by a series of strokes, into a batch of dot data comprising dot-forming bits indicative of image dots to be formed at positions of respective picture elements which correspond to each stroke of the visible representation, said data converting apparatus comprising:

coordinate calculating means for superimposing said outline of each of said strokes on a coordinated pixel screen in which said picture elements are defined by a plurality of parallel x-axis pixel lines and a plurality of parallel y-axis pixel lines intersecting said x-axis pixel lines, one of said plurality of x-axis pixel lines and said plurality of y-axis pixel lines functioning as a plurality of scanning lines, said coordinate calculating means calculating, for each of said strokes, coordinates of intersections between said outline of the stroke and each of said scanning lines which intersects the stoke, said intersections comprising at least one pair of intersections, each intersection pair consisting of two intersections representing a start dot and an end dot between which said image dots are formed;

coordinate memory means for storing said calculated coordinates of said intersections;

discontinuity detecting means for detecting a discontinuous portion of said each stroke as defined by said image dots to be formed according to said dot-forming bits by checking said dot-forming bits to determine whether said image dots represented by said dot-forming bits are discontinuous along the outline of said each stroke; and discontinuity eliminating means responsive to said discontinuity detecting means, for processing said outline data before said outline data are converted into said dot data, such that said dot data prepared by said dot data preparing means include dot-forming bits indicative of image dots to be formed at positions of respective picture elements which correspond to said discontinuous portion, said dot data preparing means preparing said dot data based on said calculated coordinates of said intersections, and said discontinuity detecting means detecting said discontinuous portion, based on said calculated coordinates stored in said coordinate memory means.

* * * * *